(12) United States Patent
Chakrabartty et al.

(10) Patent No.: US 12,235,948 B2
(45) Date of Patent: Feb. 25, 2025

(54) PUBLIC KEY ENCRYPTION USING SELF POWERED TIMERS

(71) Applicant: Washington University, St. Louis, MO (US)

(72) Inventors: Shantanu Chakrabartty, St. Louis, MO (US); Mustafizur Rahman, St. Louis, MO (US)

(73) Assignee: Washington University, St. Louis, MO (US)

( * ) Notice: Subject to any disclaimer, the term of this patent is extended or adjusted under 35 U.S.C. 154(b) by 473 days.

(21) Appl. No.: 17/755,692

(22) PCT Filed: Nov. 6, 2020

(86) PCT No.: PCT/US2020/059538
§ 371 (c)(1),
(2) Date: May 5, 2022

(87) PCT Pub. No.: WO2021/092488
PCT Pub. Date: May 14, 2021

(65) Prior Publication Data
US 2022/0382851 A1 Dec. 1, 2022

Related U.S. Application Data

(60) Provisional application No. 62/931,625, filed on Nov. 6, 2019.

(51) Int. Cl.
*G06F 21/44* (2013.01)
*G06F 21/42* (2013.01)
*H04L 9/30* (2006.01)

(52) U.S. Cl.
CPC .............. *G06F 21/44* (2013.01); *G06F 21/42* (2013.01); *H04L 9/3006* (2013.01)

(58) Field of Classification Search
CPC ......... G06F 21/44; G06F 21/42; H04L 9/3006
USPC .......................................................... 726/4
See application file for complete search history.

(56) References Cited

U.S. PATENT DOCUMENTS

| | | | |
|---|---|---|---|
| 5,481,613 | A | 1/1996 | Ford et al. |
| 6,711,263 | B1 | 3/2004 | Nordenstam et al. |
| 7,479,911 | B2 | 1/2009 | Chakrabartty |
| 8,056,420 | B2 | 11/2011 | Chakrabartty et al. |
| 8,963,647 | B2 | 2/2015 | Chakrabartty |
| 9,678,548 | B1 | 6/2017 | Duane |

(Continued)

OTHER PUBLICATIONS

International Search Report and Written Opinion issued in PCT/US2020/059823 mailed on Feb. 11, 2021; pp. 1-8.

Primary Examiner — Teshome Hailu
(74) Attorney, Agent, or Firm — Armstrong Teasdale LLP

(57) ABSTRACT

A one-time self-powered timer circuit whose state can be measured only once, after which the timer will desynchronize itself. In this manner, the timers can only be used for one-pad authentication. The security of the public-key distribution algorithms that will exploit the synchronization between billions of hardware-software timers, time reversibility of software timer and time irreversibility of hardware timers and one-time read-out to deliver classical and quantum-like benefits. System-on-chip and circuit implementation of the self-powered timer array, read-out, programming and initialization modules that implements the proposed public-key distribution algorithms.

14 Claims, 32 Drawing Sheets

(56) References Cited

U.S. PATENT DOCUMENTS

| | | |
|---|---|---|
| 9,793,830 B2 | 10/2017 | Lajnef et al. |
| 10,446,234 B2 | 10/2019 | Chakrabartty et al. |
| 2012/0066500 A1 | 3/2012 | Ananthasubramanian et al. |
| 2013/0010957 A1 | 1/2013 | Yu et al. |
| 2017/0063566 A1* | 3/2017 | Seminario ............... H04L 67/12 |
| 2018/0087957 A1 | 3/2018 | Chakrabartty et al. |
| 2019/0094078 A1 | 3/2019 | Chakrabartty et al. |
| 2022/0198043 A1* | 6/2022 | Kozlowski ............ G06F 9/5072 |
| 2022/0312198 A1* | 9/2022 | Koshta ................. H04W 12/63 |
| 2023/0259603 A1* | 8/2023 | Young de la Sota ....................... G06F 9/30101 726/20 |

* cited by examiner

- Mismatch ($V_{Mis}$)
- Temperature ($V_{Temp}$)
- External Modulation ($V_{Ext}$)

$V_m = V_{Mis} + V_{Temp} + V_{Ext}$ $\Delta V = V_{FN} - V_{FNM} = \dfrac{k_1 V_m t}{k_1 t + k_0}$

PUBLIC KEY ENCRYPTION USING SELF POWERED TIMERS

CROSS-REFERENCE TO RELATED APPLICATION

The application is a U.S. National Phase Application of PCT/US2020/059538 filed on Nov. 6, 2020, which claims priority benefit of U.S. Provisional Patent Application Ser. No. 62/931,625 filed on Nov. 6, 2019, the contents of which are hereby incorporated herein by reference in their entireties.

GOVERNMENT LICENSE RIGHTS

This invention was made with government support under grants ECCS: 1550096 and CNS 1525476 awarded by the National Science Foundation. The government has certain rights in this invention.

BACKGROUND

At a fundamental level both classical and quantum key distribution techniques rely on use of one-way functions to guarantee the security of communications. In classical key exchange algorithms, the one-way functions are mathematical constructs that are easy to encode, but are difficult to decode. For example, the RSA based public-key distribution algorithm exploits the fact that it is relatively easy to multiply two large integers, but it is very difficult to factorize a large integer into its two prime number constituents. Other examples of mathematical one-way functions include cryptographic hash functions or discrete logarithms. In quantum key distribution, one-way functions are physically implemented using principles of quantum-mechanics, like quantum entanglement or the "no-cloning" principle. Thus, quantum key distribution algorithms come with security guarantees, a feature that cannot be applied to classical approaches. With continual advancements in computing power and the possibility of an operational quantum computer becoming a reality, the vulnerability of classical key distribution algorithms is a major concern. While quantum-based key distribution can potentially address some of the security vulnerabilities associated with classic key distribution techniques, the current state-of-the-art quantum key-distribution systems require dedicated and specialized peer-to-peer communication links. Not only do these links require careful maintenance and calibration to ensure quantum-coherence, compared to classical approaches, these systems are not portable and cannot be used for key distribution over public or unsecured channels. A hardware-software public-key distribution framework may potentially deliver the benefits of both classical and quantum key-exchange approaches.

The key motivation that led to the development of the self-powered or zero-power timer technology is that existing authentication techniques (using encryption, strong hash functions and pseudorandom number generators for securing access to critical data and assets) are impractical for low-resource internet-of-things (IoTs) like wearables, radio-frequency tags and sensors. This is because these IoT platforms have: (a) limited computational bandwidth; (b) limited availability of energy; and (c) requirements on real-time authentication. Also, authentication on these IoT platforms involve the use of static identifiers, for example bar-codes, product IDs, embedded physical unclonable functions (PUFs) or stored private keys. The static nature of these tokens makes them vulnerable to theft, counterfeiting, replay attacks or tampering. Previous hardware-software approaches may implement a SecureID type dynamic authentication protocol on passive, low-resource IoTs. The approach used the self-powered timer technology for time-keeping and for distributed synchronization without the need for any external powering (using batteries or energy-scavenging). Rapid trust verification and authentication is achieved by comparing the synchronized tokens (example random numbers in the case of SecureID type approach), generated by the IoT and a remote server (see FIG. 3). The absence of any external powering for token generation on the IoTs ensures that the dynamic tokens are secure against any power side-channel attacks. However, the success of this hardware-software authentication approach relies on three key attributes of the self-powered timer: (a) the ability of the timers to continuously operate over a long period of time (at least 2-3 years) without any external powering; (b) the ability of the timers to be accurately synchronized with respect to each other; and (c) an accurate behavioral model that can be used for implementing the "gold-standard" software timer on the authentication server (see FIGS. 2A and 2B).

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

Figure 1:
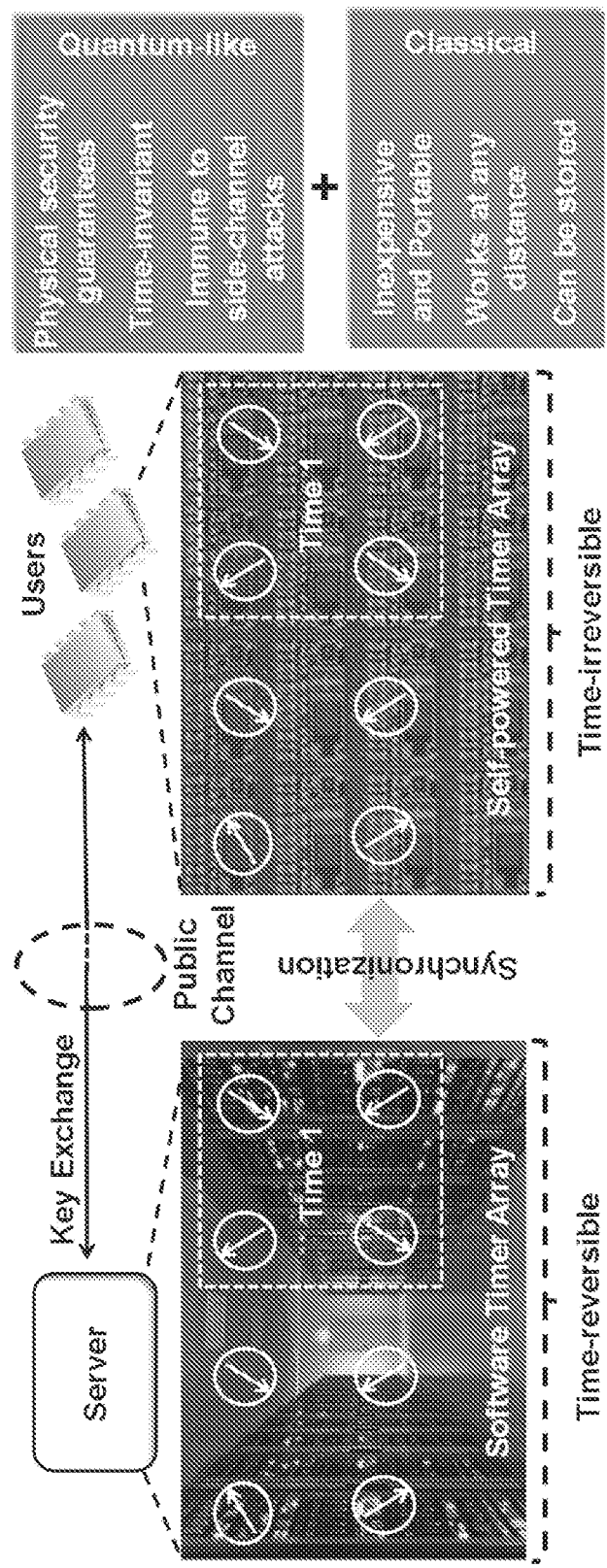
FIG. 1 is a block diagram of the proposed synchronization and time-irreversibility of self-powered timers exploited as one-way functions for novel public key exchange protocols and authentication protocols.
Figure 2A:
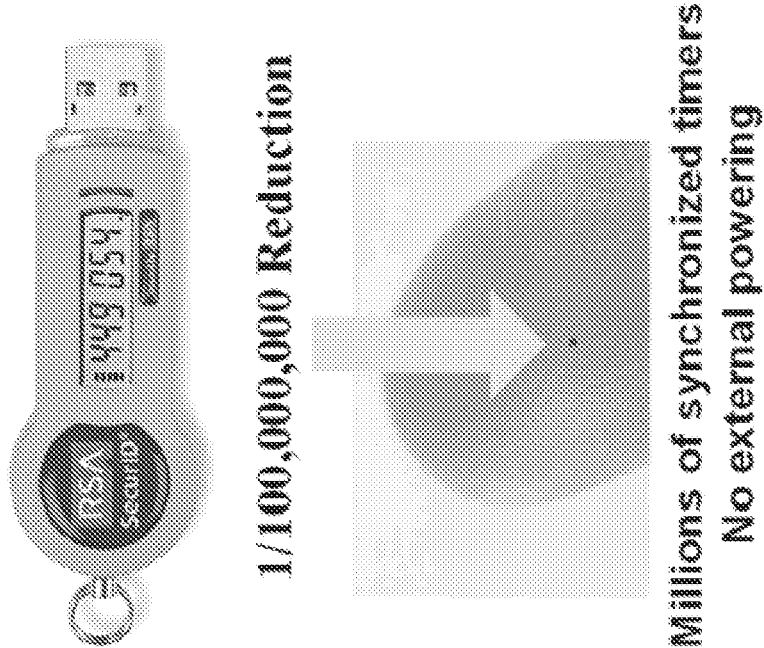
FIG. 2A is a diagram showing millions of self-powered timers integrated on a single microchip.

Public key encryption using self-powered timers are based on previously known self-powered timers. These micrometer-scale devices can be fabricated using standard integrated circuits technology, as a result of which millions of these timers can be economically integrated on a single chipset and operate without any external powering. These timers can maintain synchronization or phase-coherence for durations greater than 2 years (under room temperature conditions), even when the chipsets are spatially separated from each other. Also, due to its self-powered operation, the state of the timer cannot be probed using a power-side-channel or an electromagnetic side-channel. The concept of public key encryption using self-powered exploits the synchronization capability and the security features of the self-powered timers to investigate a public-key distribution framework that can deliver the benefits of both classical and quantum approaches where an array of synchronized timers will be used to emulate the functionality of phase-synchronized photons in the context of quantum currency and quantum key-exchange protocols (see FIG. 1). Like photons in quantum cryptography, chipsets integrating millions of timers are publicly distributed to all users. Each of the self-powered timers on these chipsets is synchronized with its software clone running on a server. However, the main distinction between the software and hardware timers is that the hardware timer cannot be rewound (or will be time-irreversible) where as its software clone can be rewound to any previous time-instant. This asymmetry is exploited as a one-way function for implementing RSA-like public-key distribution. Note that once the secret keys have been exchanged between two parties, traditional cryptographic approaches could be used for secure communications. With respect to hardware, the proposed technology signifies a reduction in volume compared to an RSA SecureID token generator which uses physical and cryptographic methods to prevent tampering and backward traceability attacks (see FIG. 2A).

Figure 2B:
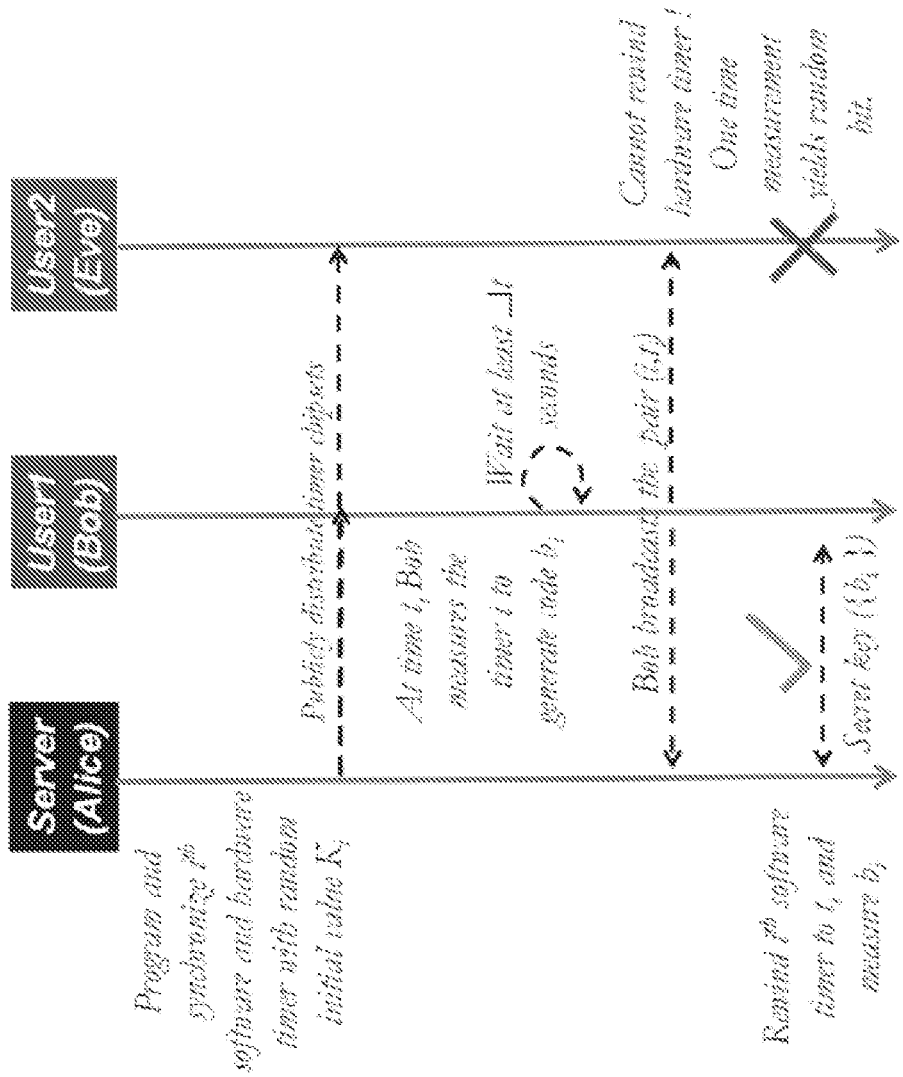
FIG. 2B is a basic public-key distribution protocol using the self-powered timers.

The basic key-exchange protocol is based on the self-powered timer array (see FIG. 2B). A server (Alice) programs the $i^{th}$ timer on multiple chipsets to an initial value Ki. These identically programmed chipsets are then distributed to all users over a public channel (see FIG. 1). When an intended user (e.g., Bob) wishes to communicate with the server (e.g., Alice), he measures the state bi of the $i^{th}$ timer at time instant ti. After a random delay Δt, Bob broadcasts the pair (i,ti) over the public channel. The server (Alice) then uses the pair (i,ti) and her knowledge of the secret key Ki to decipher bi. The adversary (e.g., Eve) on the other hand does not have access to Ki and therefore cannot use the public information (i,ti) to decipher the bits bi. Also, Eve is unable to rewind/reset the hardware timer on her copy of the chipset to measure the bits bi. Because the timers are designed for one-time access/read-out, Eve is unable to make multiple measurements on the timer to infer any useful information (using machine learning approaches) about Ki or bi. Note the construction and the operating physics of the self-powered timer also prevents Eve to probe the state of the timer using any side-channel and without affecting the state of the timer. Therefore, in this regard, the timer chipset emulates a quantum communication channel, but using timers instead of photons.

Self-Powered Timer Hardware

Figure 4A:
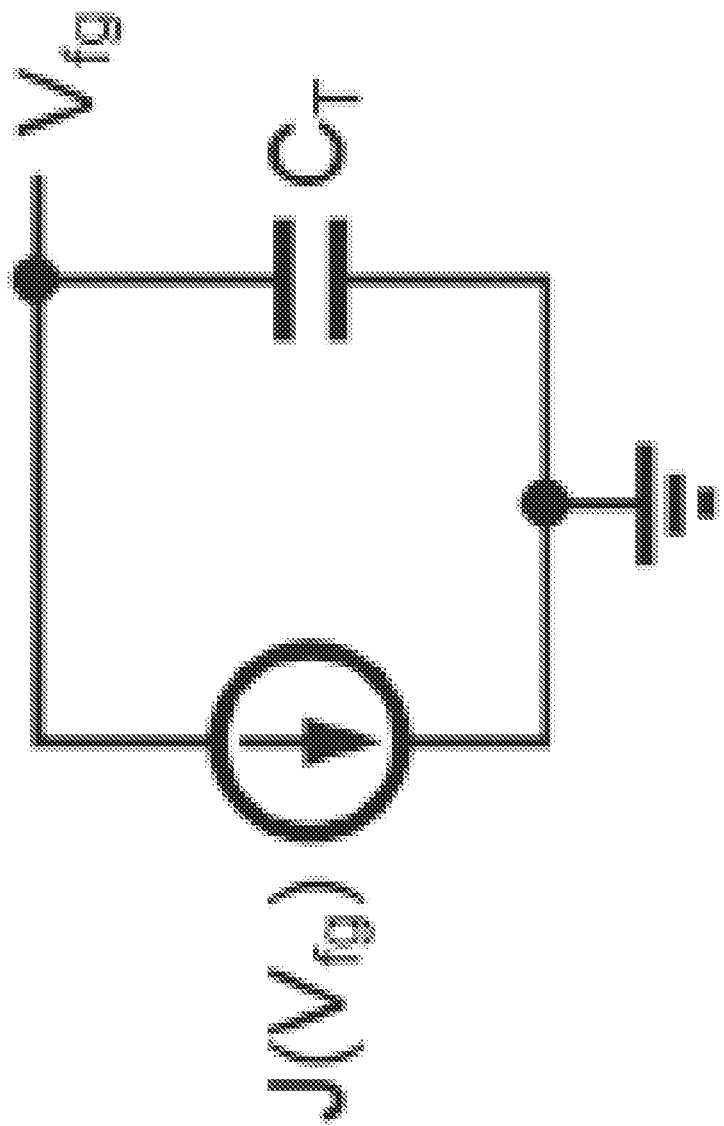
FIG. 4A is an equivalent circuit of the self-powered timer comprising of a leakage current element discharging a capacitor.

A self-powered time-keeping device is based on the physics of Fowler-Nordheim (FN) tunneling of electrons. The principle of operation for the device and its equivalent circuit model is shown in FIG. 4(a) where a leakage-current $J(V_{fg})$ discharges a precharged capacitor $C_{fg}$. The change in voltage $\Delta V_{fg}$ serves as an indicator of the time elapsed since the capacitor was initially charged. However, there are two fundamental challenges in implementing such a time-keeping device. First, an ultra-low leakage current $J(V_{fg})$ would be required if the device needed to keep time for durations greater than three years. For example, ensuring a 1-V change across a 1-pF on-chip capacitance over a duration of one year would require a discharge current of 3.2×10−20 A (equivalent to a rate of ten electrons per minute). Even if it is possible to achieve such low-current leakage, the second challenge would be to ensure that the operation this time-keeping device is robust to mismatch and fabrication artifacts. FN tunneling of electrons through a gate-oxide barrier can achieve the desired long-term discharge characteristics.

Figure 4B:
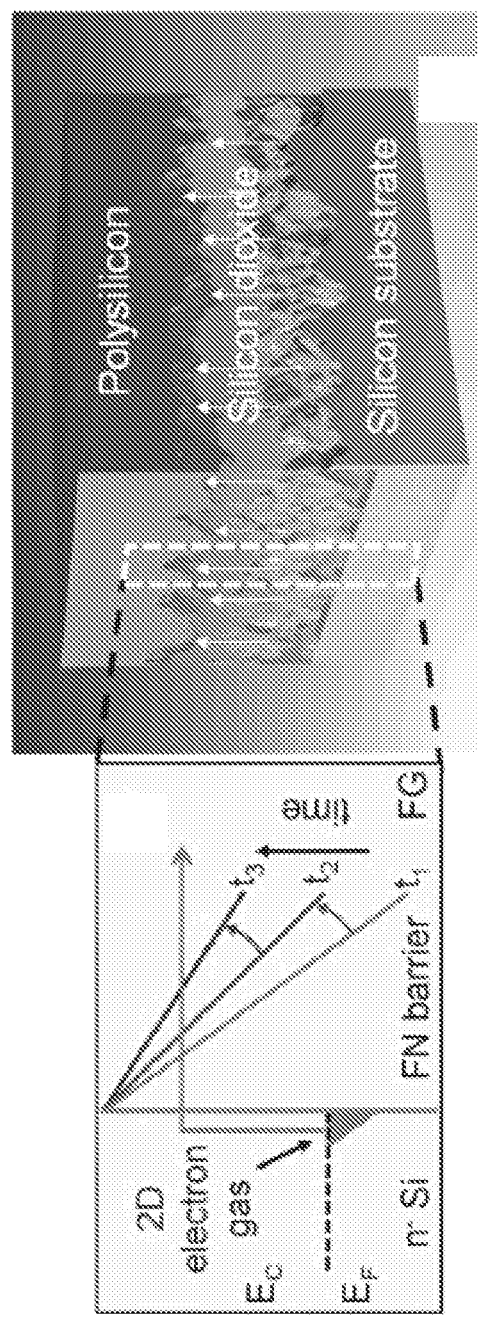
FIG. 4B is a graph of the physical principle where the leakage current is implemented by electron tunneling across an FN tunneling barrier, as well as the floating-gate implementation of an FN tunneling barrier using an oxide layer separating polysilicon and a doped silicon substrate.

The operating physics of this device uses an energy-band diagram (see FIG. 4B). Thermally-excited electrons tunnel through a triangular FN tunneling barrier onto a conductive island that is electrically insulated (labeled as a floating-gate). The tunneling of an electron changes the potential of the floating-gate which in-turn decreases the slope of the FN tunneling barrier. The FN tunneling device was implemented using a floating-gate (FG) where the thermally grown gate-oxide (silicon-di-oxide) acts as a FN tunneling barrier that separates the lightly-doped n-type semiconductor substrate and the polysilicon floating-gate (FG) (see FIG. 4B). An approximate two-dimensional sheet of electron gas and a triangular FN tunneling barrier is created by depleting the floating-gate of electrons and creating a large potential difference (>7.0 V).

Figure 4C:
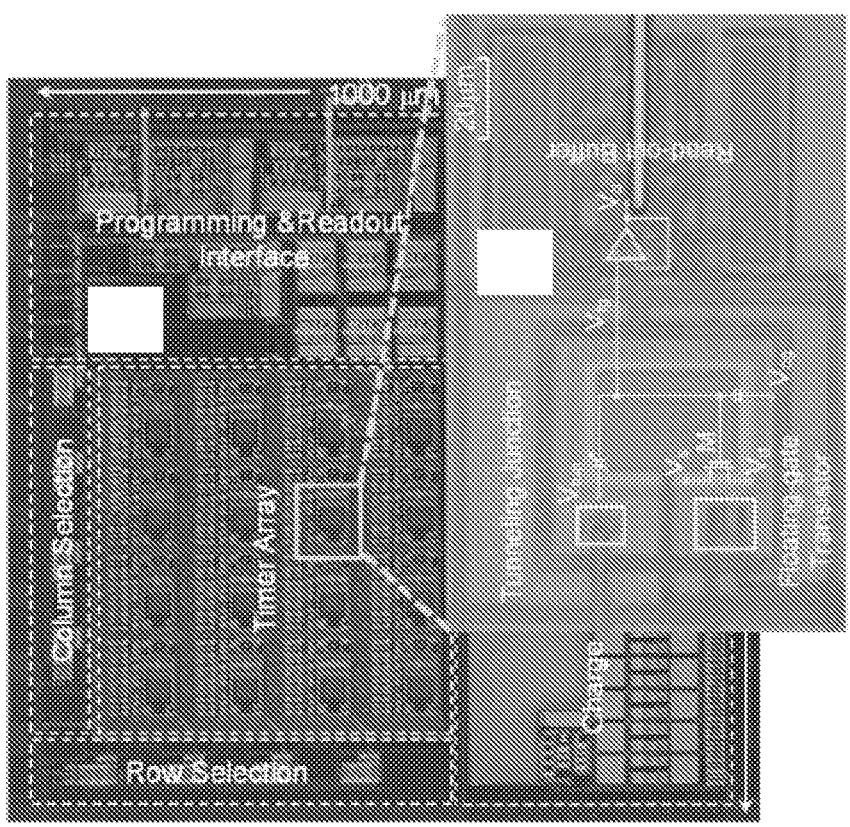
FIG. 4C is a circuit level implementation of the zero-power timer using floating-gate transistors with an integrated read-out buffer and system-on-chip implementation of the zero-power timer array with integrated charge-pump and programming circuits.
Figure 4D:
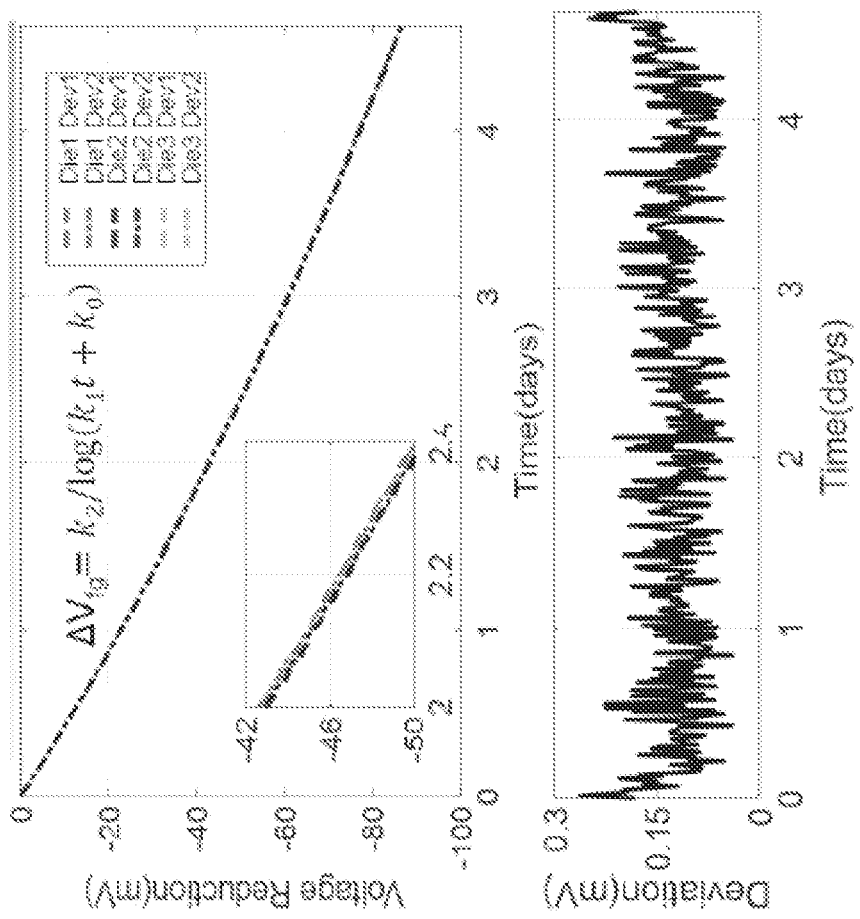
FIG. 4D is a graph of measured responses from different timers integrated on the same and different silicon chipset, and a graph of synchronization accuracy between the self-powered timers measured over duration of 5 days.

The dynamics of the device can be described using a first-order differential equation where the change in floating-gate voltage $\Delta V_{fg}(t)$ decays as $k_2/\log(k_1 t + k_0)$, as a function of time t. Note that the decay-rate $\Delta V_{fg}(t) \approx O(1/\log(t))$ is slower than what can be achieved using other leakage mechanisms, like reverse-diode leakage or direct tunneling based gate-oxide leakage, as a result the device was found to be operational for more than a year. The parameter set $K=\{k0,k1,k2\}$ determines the dynamics of the timer can be programmed and hence can be used for storing a private key on the timer device. The timer responses using prototypes that were fabricated in a standard CMOS process are experimentally verified. Example system-on-chip implementation integrating different timer structures may be used (see FIG. 4C). The implementation comprises of basic read-out circuits and circuits to initialize the charge on the floating-gate capacitor $C_{fg}$. The beauty and novelty of the FG device is a self-compensating (SC) physics that asymptotically leads to a configuration where tunneling predominantly occurs through only one spatially isolated barrier. Initially, the tunneling currents differ from each other, however, asymptotically the different time-evolutions converge. The spatial distribution of tunneling currents will asymptotically be dominated by a barrier at one spatial location. This effect is also evident in the time-evolution of the measured floating-gate potential for different timers (located on the same and different chipsets) where each of the responses exhibit a synchronized ≈1/log (t) response (see FIG. 4D). The deviation across different timers measured over a duration of 5 days lead to a reported synchronization error of less than 0.1%.

Figure 5A:
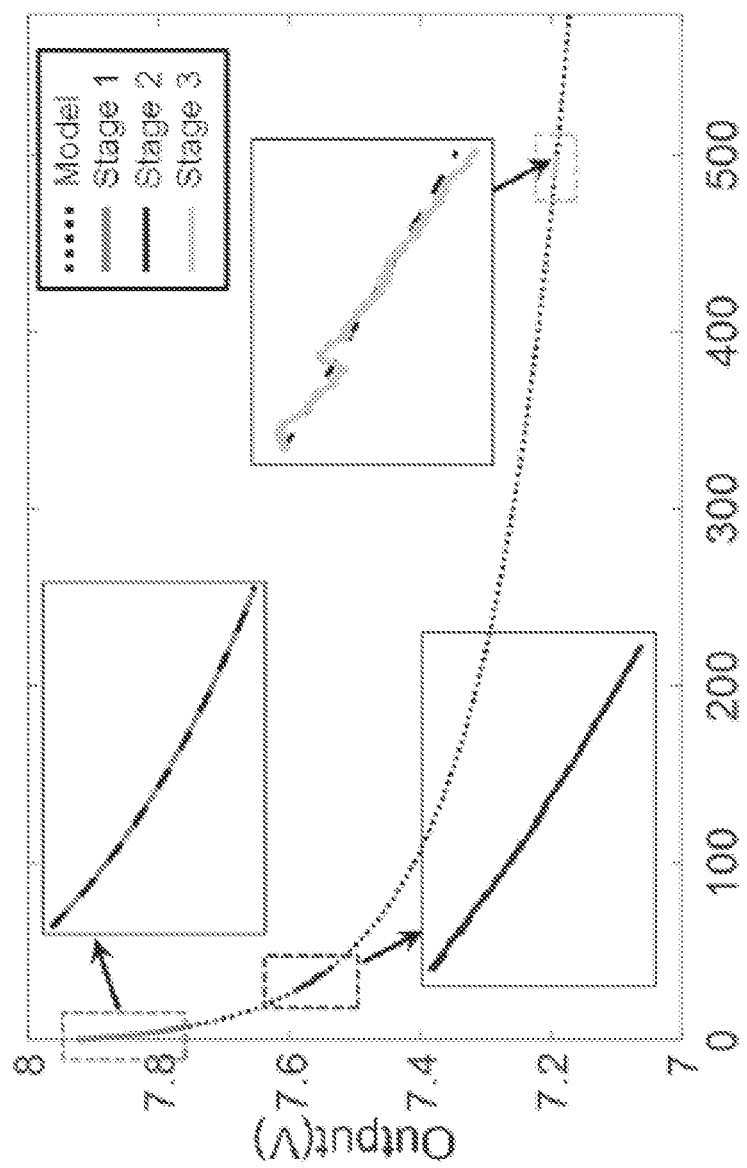
FIG. 5A is graph of a time-stitching approach to verify that the self-powered timer can continuously operate over a duration greater than 1.5 years, as well as insets showing that a single software model can accurately capture the response across three different regions.
Figure 5B:
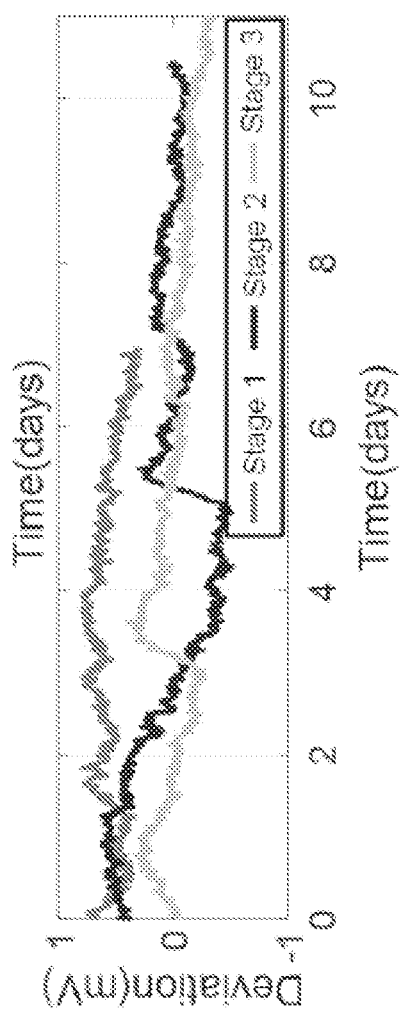
FIG. 5B is a graph of synchronization accuracy between the software model and the measured response for a self-powered timer.

The self-powered time-keeping device is verified to continuously operate over durations greater than a year and whether its long-term response can be accurately described using a software timer model. Instead of measuring the response over a year duration, time-stitching approach is used where the long-term operation of the timer is emulated. Each of the three highlighted regions corresponds to continuous measurement for durations up to 2 weeks, after the FG device has been programmed to different initial voltages (see FIG. 5A). The results show that a single 1/log(t) time-evolution model (shown by dotted line) can capture the respective responses in each of the three regions (see FIG. 5A). For one region the tunneling rates are in the order of a few electrons per minute and correspond to the device operation after a 1.5 year interval. The magnitude of the residual error shown for each of the regions is similar, highlighting that noise-floor is determined by measurement or buffer noise. The result also shows excellent synchronization between a software model which comprises of three model parameters. The model and its parameters are used for implementing the software timer and the private key.

Figure 5C:
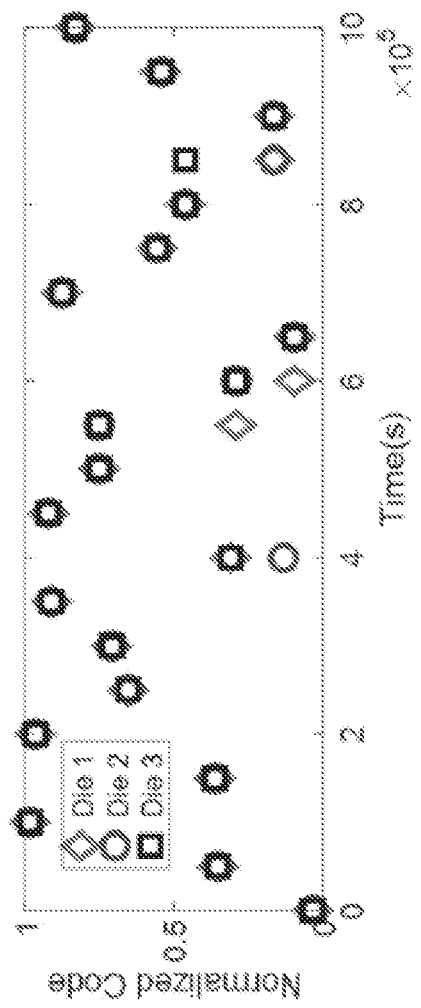
FIG. 5C is a graph of synchronized authentication tokens generated by three different timers whose output is used to seed an LFSR
Figure 5D:
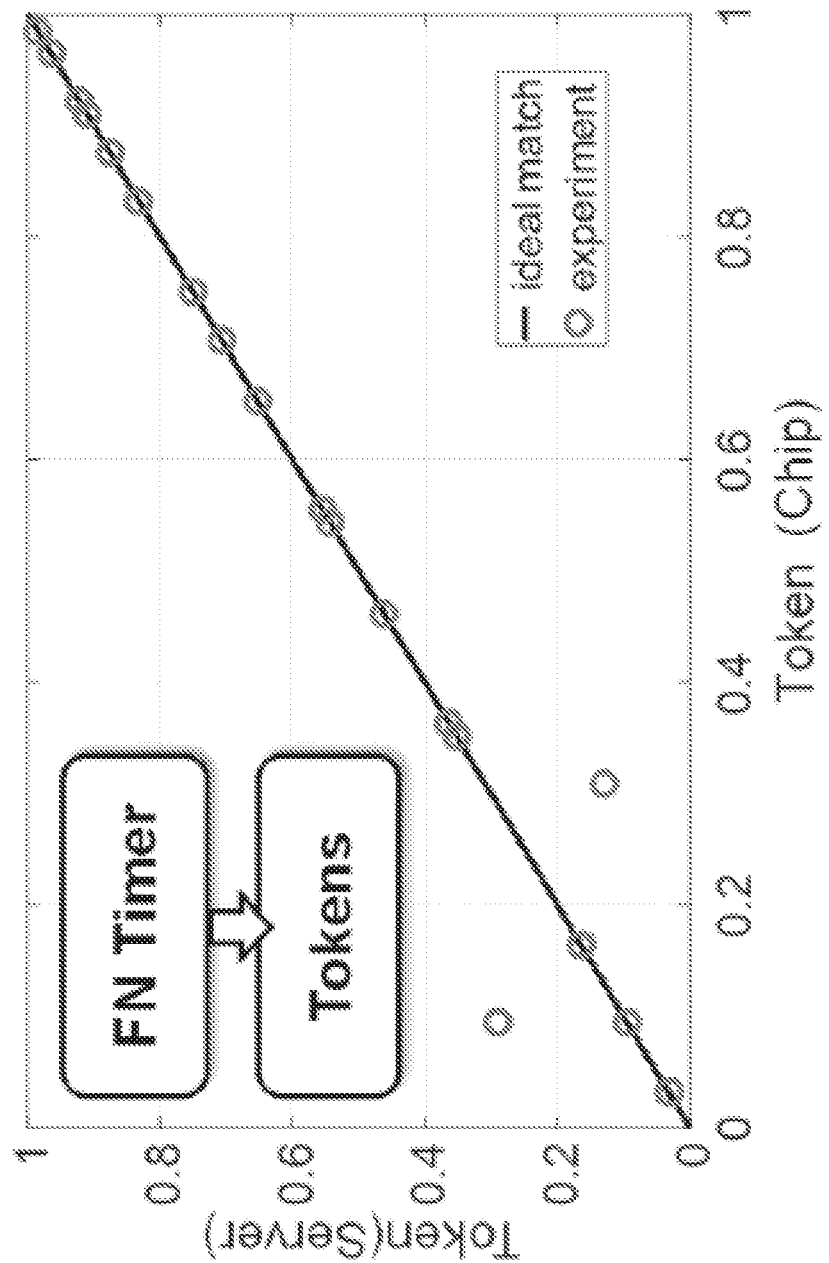
FIG. 5D is a graph of synchronization between the software and hardware authentication tokens.

The output of the timer is combined with a pseudo-random number generator (PRNG) to produce authentication tokens. The system inset comprises of two modules: (a) the timer which is self-powered and continuously keeps track of time; and (b) a PRNG which is externally powered when an authentication value is requested from the tag (see FIG. 5D). When a request signal is sent to the IoT, the timer value is readout and digitized. The digitized value is then used to seed the PRNG such as a Linear Feedback Shift Register (LFSR). The time-varying seed breaks the predictable periodic pattern of the PRNG and makes it function like a true RNG. A synchronized timer stored on the server goes through the same process and should generate random tokens that are identical to the tokens generated on the IoT. By comparing the synchronicity between the two generated random number tokens, authentication can be achieved. On one hand, due to the existence of the PRNG, the timer value can be masked and protected from machine learning attacks. On the other hand, the timer breaks the pattern of the PRNG and therefore makes it difficult to predict the random output. The normalized random tokens are generated using the output from two synchronized timers to feed a software version of PRNG (see FIG. 5C). As can be observed, at some time instants, the codes deviate from each other due to the mismatch and quantization error of the digitization process. This issue can be easily tackled by searching a predetermined range of the reference timer values, therefore providing a level of tolerance.

Self-Powered Timer Authentication Algorithms

To enhance the robustness of the timer-based authentication algorithm to hardware failures and timer artifacts, a set of M timers (instead of one) may be used. The main motivation behind this approach is to account for any possible error in the timer values as result of aging or possible security manipulation. In the case of multiple timers, each of these timers generates its own value to be involved in authentication and confidence enhancement. The basic authentication protocol uses a hash-function h(.,.) whose inputs are a private key and the current value of the timer and whose output is an authentication token. For the timer, the private key could be the initialization parameters of the timer, namely $K=\{k_0, k_1, k_2\}$. Specifically, at each authentication time the reader/server R requests M authentication tokens from the IoT which are computed as $$A_{ji}=h(K_j,V_{ji}), \text{ for } j=1,2,\ldots,M. \quad \text{(eqn. 1)}$$

where $V_{ji}$ are the v least significant bits (LSBs) corresponding to the jth timer value and $A_{ji}$ is T output bits. Based on these values the reader decides the authentication confidence level of any given tag. The resulting M authentication values $A_{1i}, A_{2i}, \ldots, A_{Mi}$ from eqn. 1 are compared to the set of expected authentication values at the reader or server side $\sim A_{1i}, \sim A_{2i}, \ldots, \sim A_{Mi}$ according to $$A_{ji}=\sim A_{ji} \text{ for } j=1,2,\ldots,M. \quad \text{(eqn. 2)}$$

The match between the two sets are used to compute the authentication confidence level as Confidence Level=Number of matches/M. To tolerate possible errors in timer readout or timer-based failures, the authentication could be based on different thresholds of confidence levels. The server/reader could also use a search algorithm in the neighborhood of the authentication token received from the IoT, to differentiate between natural or malicious deviations.

Figure 6:
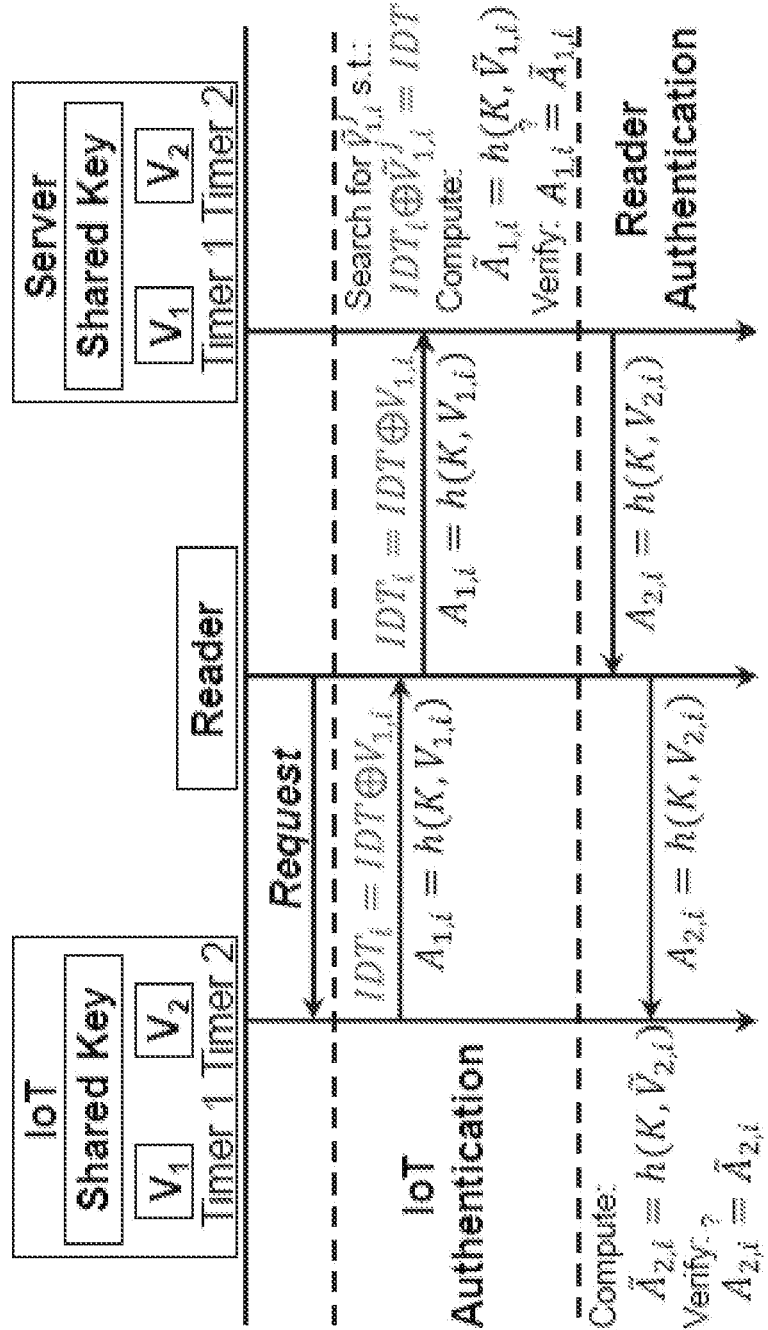
FIG. 6 is a HMAP and HPMAP authentication protocol which enables the server to authenticate the IoT device and the IoT device to authenticate the reader and the server.
Figure 7A:
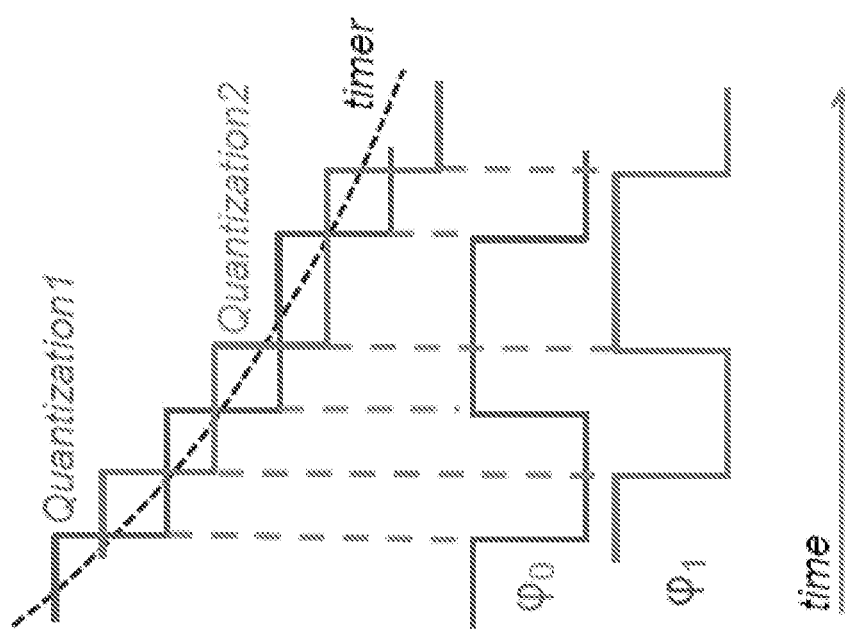
FIG. 7A is a generalized version of the self-powered timer based public-key distribution protocol.
Figure 7B:
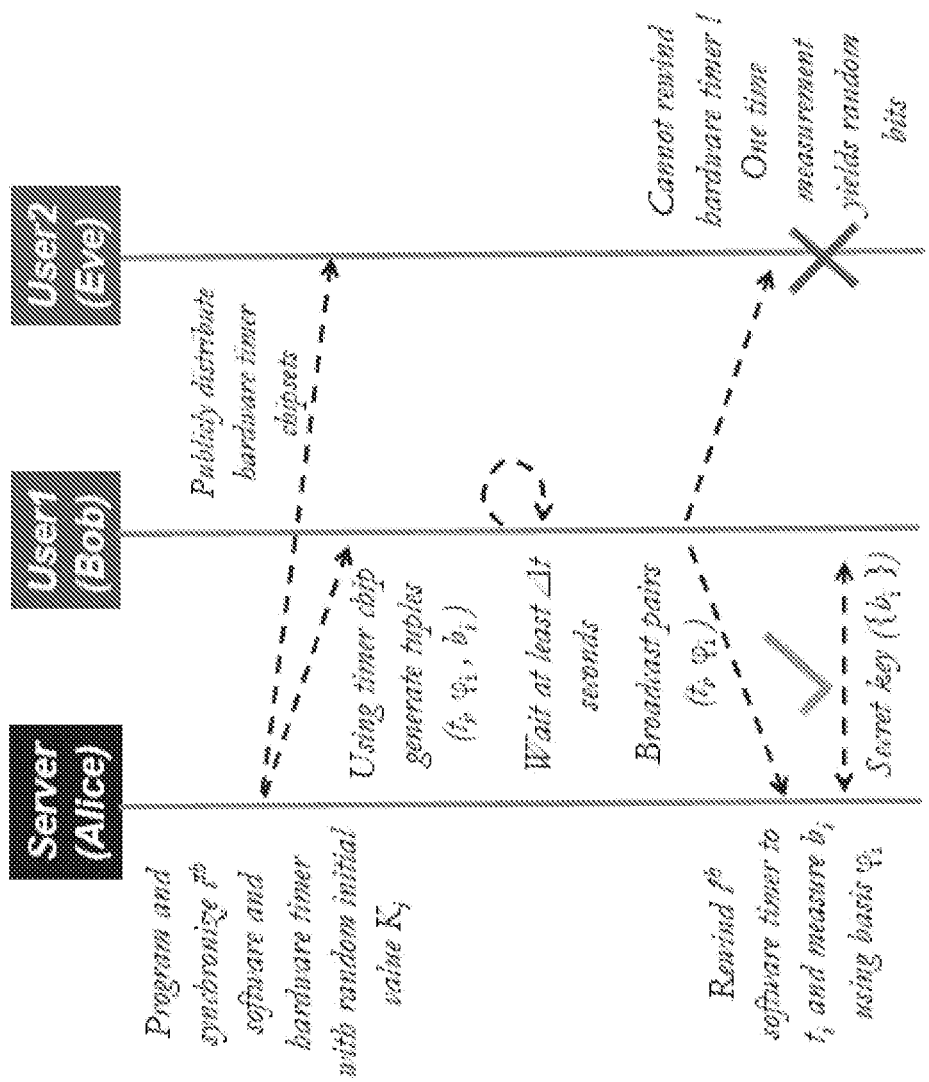
FIG. 7B is a public-key exchange protocol between a server and the users using the timer output and time-irreversibility as a one-way function.

Hash-based mutual authentication protocol (HMAP) based on the tokens generated by the zero-power timers is robust to different kinds of attacks. The analysis is based on two key assumptions/characteristics of the protocol. One is the secret shared between the IoT and the reader/server R. The other one is the transmitted messages at each communication session between the IoT and the reader/server. In the proposed protocol, the secret is the private key K which are the timer model parameters and initial conditions (see FIG. 6). The transmitted messages are basically the IoT identification IDT and the authentication token Ai. In any authentication attempt at time instance while the IoT sends the value of the same hash function, both the hash function arguments K and Vi are secure. More specifically, K is a private key that is never exposed to the adversary in cleartext and is computationally infeasible to derive. $V_i$ is dynamically and continuously updated with the fresh r-bits output from the self-powered timers leading to an unpredictable authentication value. The specific, HMAP protocol, called hash-based mutual authentication protocol (HPMAP) was extended to include the ability of the IoT device to be able to authenticate the reader as well. Both HMAP and HPMAP are able to achieve a similar or an enhanced level of security as compared to other authentication protocols reported in literature at a significantly lighter storage and computational footprint (see Table 1).

broadcasts a pair (ti, φi) where ti denotes the time at which the state of the timer is measured (see FIG. 7B). Similar to the basic protocol, the server (Alice) can use (ti, φi) to decipher the key bit bi. In this modified protocol, the probability that the adversary (Eve) can correctly guess the value of the key bit is 2-|T| where |T| denotes the total number of time instants.

One-Time Self-Powered-Timer

The security of the proposed public-key distribution procedure relies on the feature that the timer value can only be read-out once (one-time pad) after which the timer desynchronizes into some random state. In this manner, an adversary cannot use subsequent measurements of the timer state to gain some information about server key Ki using some form of machine learning attack. It is assumed that the software model of the timer is publicly known and the only private information is the key Ki. The other feature that determines the security of the proposed public key distribution protocol is the inability of the adversary (Eve) to rewind (or reset) the timer to any previous time-instant.

Figure 8A:
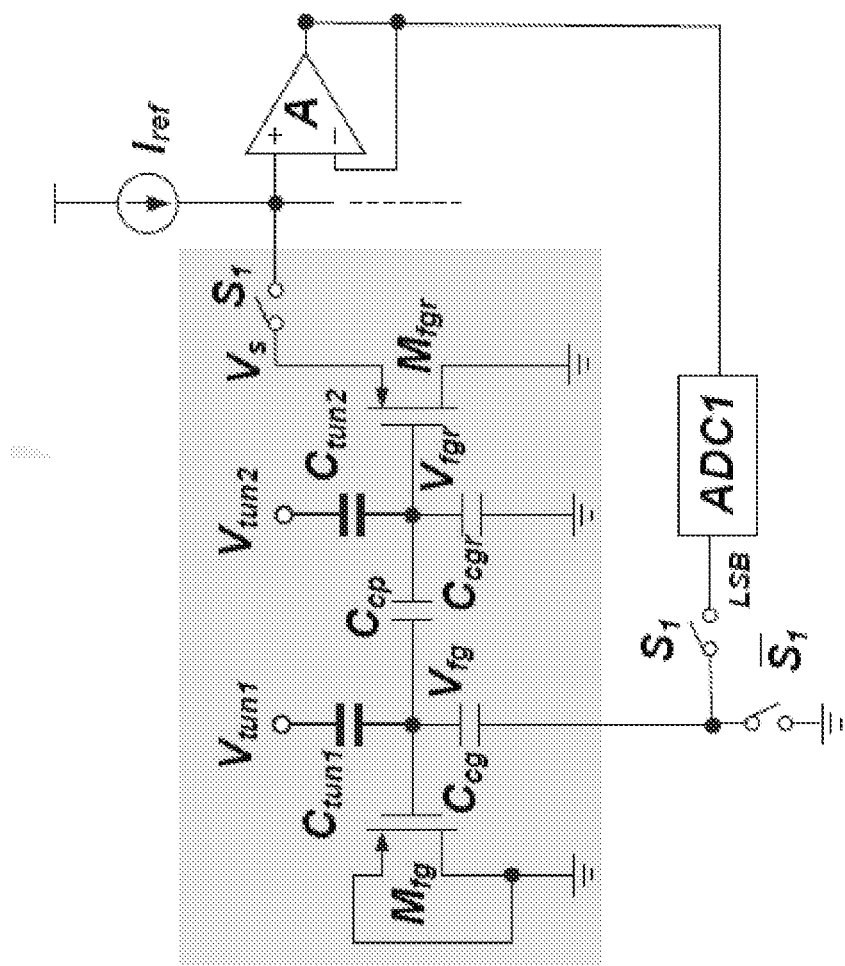
FIG. 8A is a circuit of a one-time timer whose state can be measured using one basis.

A possible circuit implementation of a one-time FN-timer is shown in FIG. 8(a) and is based on a previous designs. A timer cell (shown inside the shaded box) comprises of two floating-gate transistors $M_{fg}$ and $M_{fgr}$ where $M_{fg}$ acts as an FN-tunneling junction, and $M_{fgr}$ is used for readout in a source follower configuration. In addition to the source follower, the output Vs can also be accessed through a unity-gain buffer A and a selection switch S1. This dual readout architecture is useful to accurately calibrate the effect of the source follower. Note that the dual-floating-gate architecture has been used, because the FN tunneling of electrons into the floating-gate $M_{fg}$ occurs at relatively high voltages >7 V, which is well beyond the nominal supply voltage range of the common read-out circuits. Therefore, the dual floating-gate acts as a capacitive divider formed by $C_{cp}$ and $C_{cgr}$ to step-down the floating-gate voltage to $V_{fgr}$. Thus, $V_{fgr}$ can be expressed in terms of the floating gate charge $Q_{fgr}$ as where $C_{Tr}$ is the total capacitance seen from the gate node of $M_{fgr}$ including $C_{cgr}$ and gate capacitance of $M_{fgr}$. Note that the initial charge $Q_{fgr}$ and hence $V_{fgr}$ can be programmed to be within the nominal input dynamic range

TABLE 1

Comparison of the security of the timer-based authentication protocols with other approaches.

|  | [Wel03] | [Okh04] | [Son08] | [Zho10] | [Fu10] | HMAP | HPMAP |
|---|---|---|---|---|---|---|---|
| DoS Attack |  |  | ✓ |  | ✓ | ✓ | ✓ |
| MITM Attack |  |  | ✓ | ✓ | ✓ | ✓ | ✓ |
| Traceability Attack |  | ✓ | ✓ | ✓ |  | ✓ | ✓ |
| Replay Attack |  |  | ✓ | ✓ | ✓ | ✓ | ✓ |
| De-synchronization Attack |  |  |  | ✓ |  | ✓ | ✓ |
| Mutual Authentication | ✓ |  | ✓ | ✓ | ✓ | ✓ | ✓ |
| Privacy Preservation |  | ✓ | ✓ | ✓ | ✓ |  | ✓ |

A more generalized version of the timer-based public-key distribution protocol is shown (see FIG. 7). In this version, the state of the timer can be measured using one of two sets of basis functions (φ0, φ1). This approach is similar in spirit to the BB84 quantum key-exchange protocol. For the timer, the basis functions could be implemented as the least significant bit bi obtained after the state of the timer i is measured using one of the two sets of quantizers (see FIG. 7A). Thus, in the generalized protocol shown, the user (Bob)

of the readout circuits where the leakage is negligible. Since $Q_{fgr}$ can be assumed to be constant, $V_{fgr}$ will vary linearly with respect to $V_{fg}$.

One-Time Self-Powered Timer With A Single Measurement Basis

A possible implementation of the one-time timer which supports the basic protocol is shown (see FIG. 8A). Here, only one basis φi is used for measuring the state of the timer denoted by the bit bi. The bit bi could be the least-significant-bit (LSB) of an analog-to-digital converter (ADC) which is capacitively coupled to the floating-gate by Ccg, forming a positive feedback. Once the selection switch S1 is turned ON, like a DRAM read-out, bi or the LSB of the ADC is latched which in turn modifies the charge on the floating-gate Vfg. As long as the LSB is within the synchronization error between the hardware timer and its software clone, and the change in timer voltage within the broadcast time Δt is greater than 1 LSB, the timer content can be considered to be destroyed.

One-Time Self-Powered Timer With Two Or More Measurement Basis

Figure 8B:
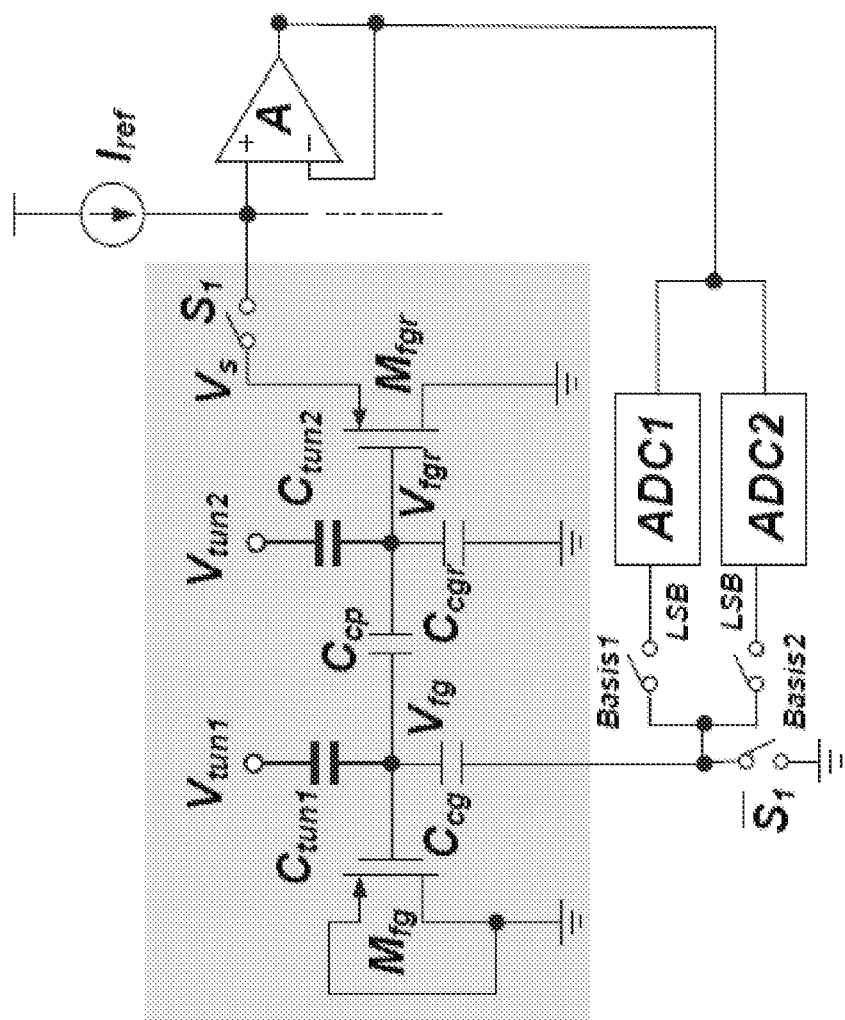
FIG. 8B is a circuit of a one-time timer whose state can be measured using two bases.

The variant of the one-time timer is proposed to support the protocol (see FIG. 8B). The user can choose one of two basis functions φ0, φ1 to measure the state of the timer to produce bi. φ0, φ1 are implemented by extracting the LSB's corresponding to the two ADCs that are shifted by an offset. Similarly, the state of the timer is latched once the selection switch S1 is enabled. For both topologies, a standard 12-bit ADC (with LSB of 200 μV) is estimated to be sufficient. Since the ADC will be powered only during the read-out, its power dissipation specification is not of a significant concern. As a result different possible implementations of the 12-bit ADC may be investigated. However, isolating the ADC and its clocking circuitry from the floating-gate will be important to avoid substrate noise coupling or noise injection through clock feedthrough. To ensure isolation and shielding, ADCs are placed on the periphery of the timer array or in a separate epitaxial region or an n-well.

One-Time Differential Self-Powered Timer With Analog Measurement Basis

Figure 8C:
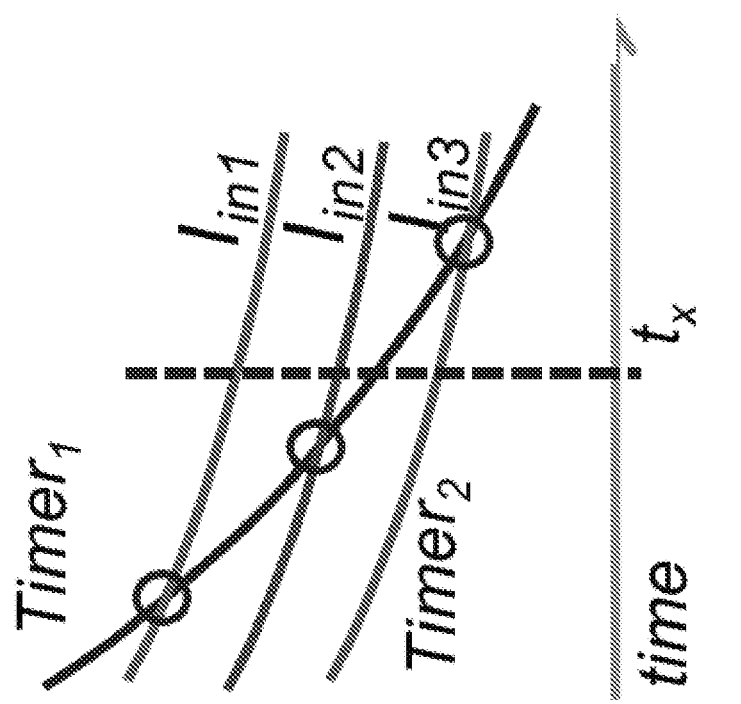
FIG. 8C is a differential one-pad timer topology where the binary state of the timer is measured with respect to an analog basis.
Figure 8D:
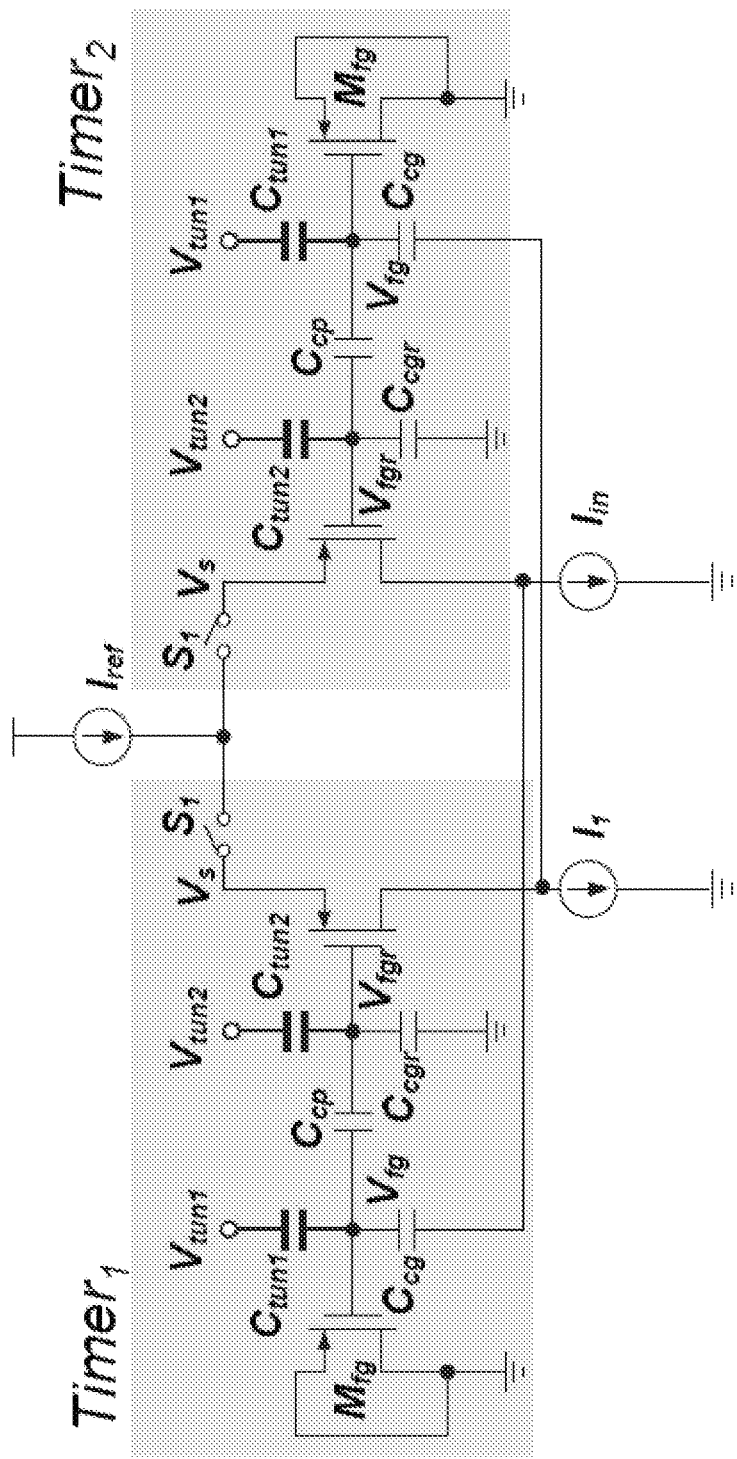
FIG. 8D is a proposed differential read-out topology circuit using two timer cells FIG. 9A are graphs for experiments to measure timer desynchronization triggered by differences in temperature exposure.

A topology that avoids the use of ADCs and the supporting clocking circuitry is investigated. The proposed differential read-out topology which uses two timer cells Timer1 and Timer2 (see FIG. 8D). Each of the two timers will be configured to leak at different rates (determined by the thickness of the gate-oxide) (see FIG. 8C). Therefore, the temporal responses of the timers will intersect (or coincide) at a time that will be determined not only by their decay characteristics but also by the initial conditions or private key K. The state of the timer-pair would be whether the timer responses have intersected (state '1') or not (state '0'). However, during read-out the state is accessed by setting the read-out current $I_{in}$ to a specific value which will be equivalent to vertically translating the response of Timer2. In this manner the basis φi is implemented using the analog input current $I_{in}$ (or equivalently voltage $V_{in}$). The differential timers are configured in a cross-coupled configuration, and once the switch S1 is enabled, the bit value bi is latched and the resulting positive feedback changes the content of the timer. Once the user (Bob) broadcasts the pair (ti, φi), the server (Alice) can rewind her software timer pairs to the previous time instant ti and use φi to infer the bit bi.

The Security of The Timer Based Public Key-Distribution

Figure 9A:
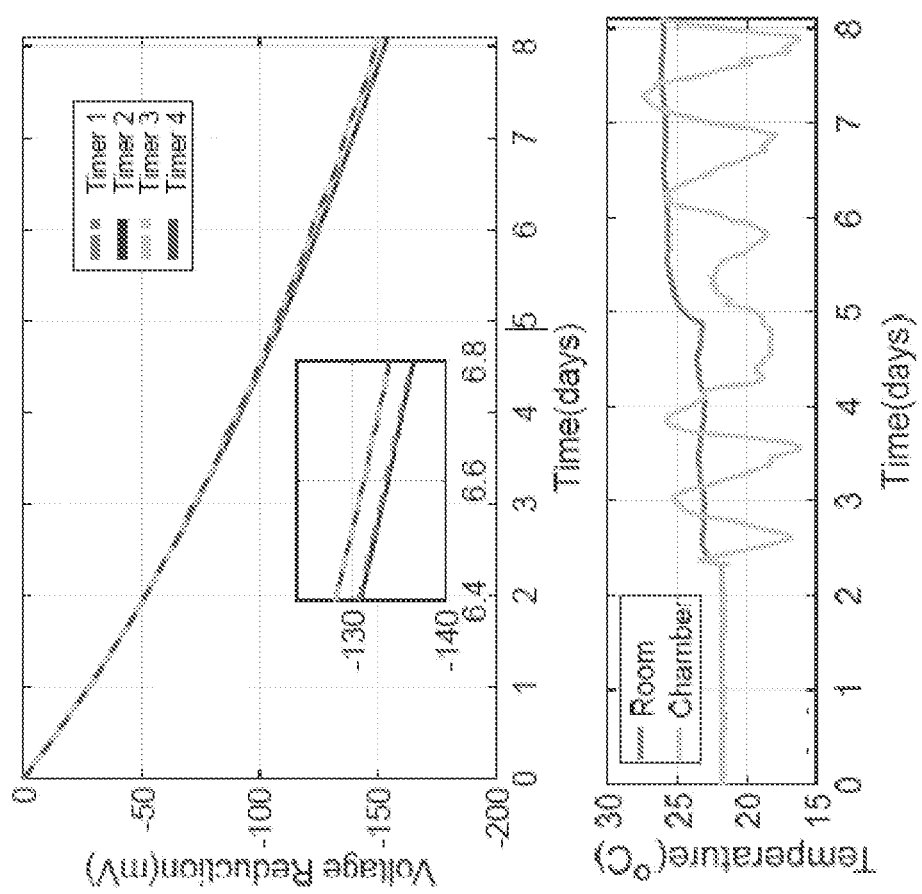
FIG. 9B are graphs for experiments to measure timer desynchronization triggered by remote EM signal.
Figure 9B:
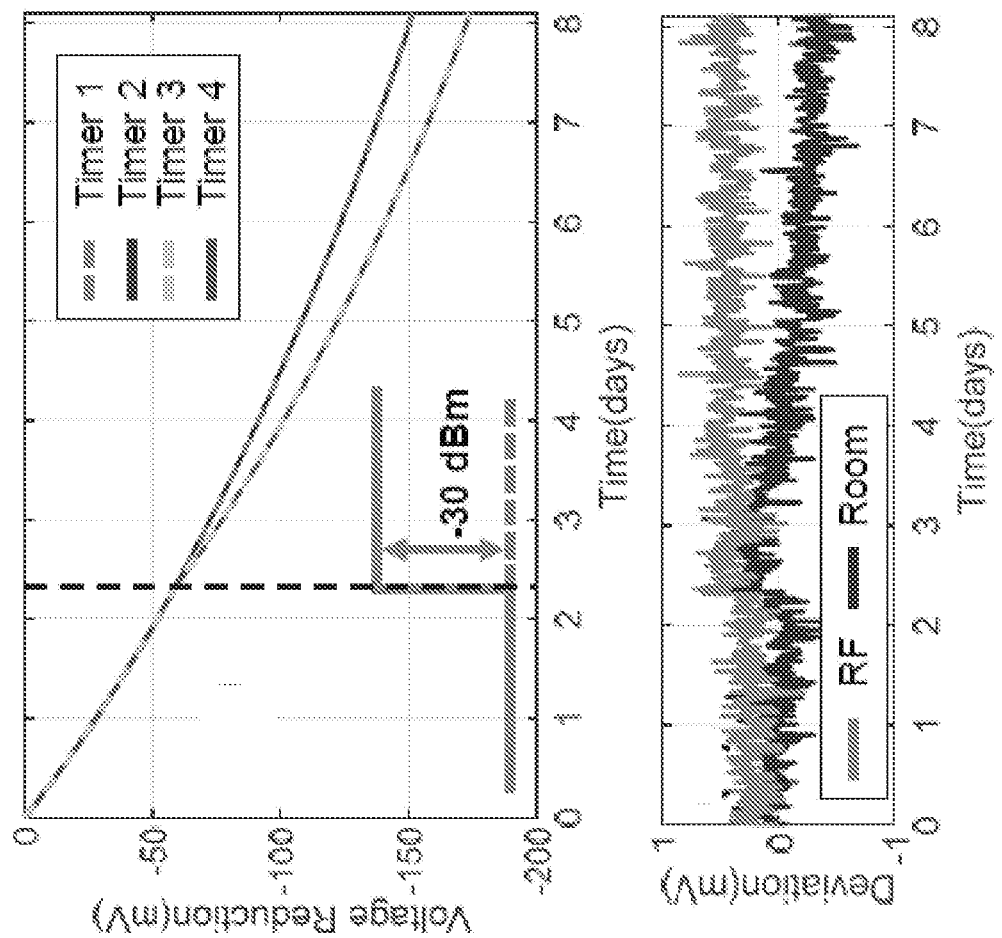

The security of the FN timer based public-key distribution procedure is investigated. Consider a system and adversarial model corresponding to the protocol shown (see FIG. 7B). The system consists of three components: the timer chipset T comprising of i=1, . . . ,N timers, a public channel R over which the user can communicate and a server S which will have the knowledge about the initial state Ki of each of the timers. It is assumed that all users and adversaries have access to the timer chipset T and the software model of the timer. The security of the protocol against different kinds of attacks is first investigated. To be able to do this analysis evaluations of the security of two key characteristics of the protocol are needed. One is the secret shared between the user (Bob) and the server (Alice) that is stored/encoded by the physical timer chipset. The other characteristic is the message (ti, φi) that is broadcast to all users over the public channel. In the proposed protocol, the secret is the private key Ki. This private key is never exposed to the adversary and is practically impossible to infer because each of the timer can be measured only once (one-time measurement). Also, due to the inherent security of the quantum-tunneling device, the content or state of the timer cannot be physically probed using side-channels (power or electromagnetic). However, the adversary can initiate other forms of attacks on the physical timers such as:

Desynchronization attacks: Since the security of the proposed key-distribution protocol relies on the synchronization between the hardware timer and the software timer, any type of desynchronization will adversely affect the protocol as a denial-of-service. Different mechanisms to desynchronize the FN timers remotely are investigated. Note that since the timers are designed for only one-time read-out, one mechanism for a denial-of-service (DoS) attack is intentionally trigger a read-out procedure on a large number of timers. This type of DoS attack could be prevented by deconsolidating the supply-chain that publicly distributes the chipsets to the end users. Another type of DoS attack could be directed to specific timer chipsets where the goal would be to intentionally modify the timer responses using an external modulation/trigger signal. Two examples of desynchronization attacks using temperature modulation or using an radio-frequency trigger signal (see FIG. 9). Timers pairs that were exposed to similar temperature and radio-frequency power levels remain synchronized whereas the timer pair subjected to different conditions become desynchronized.

Figure 3:
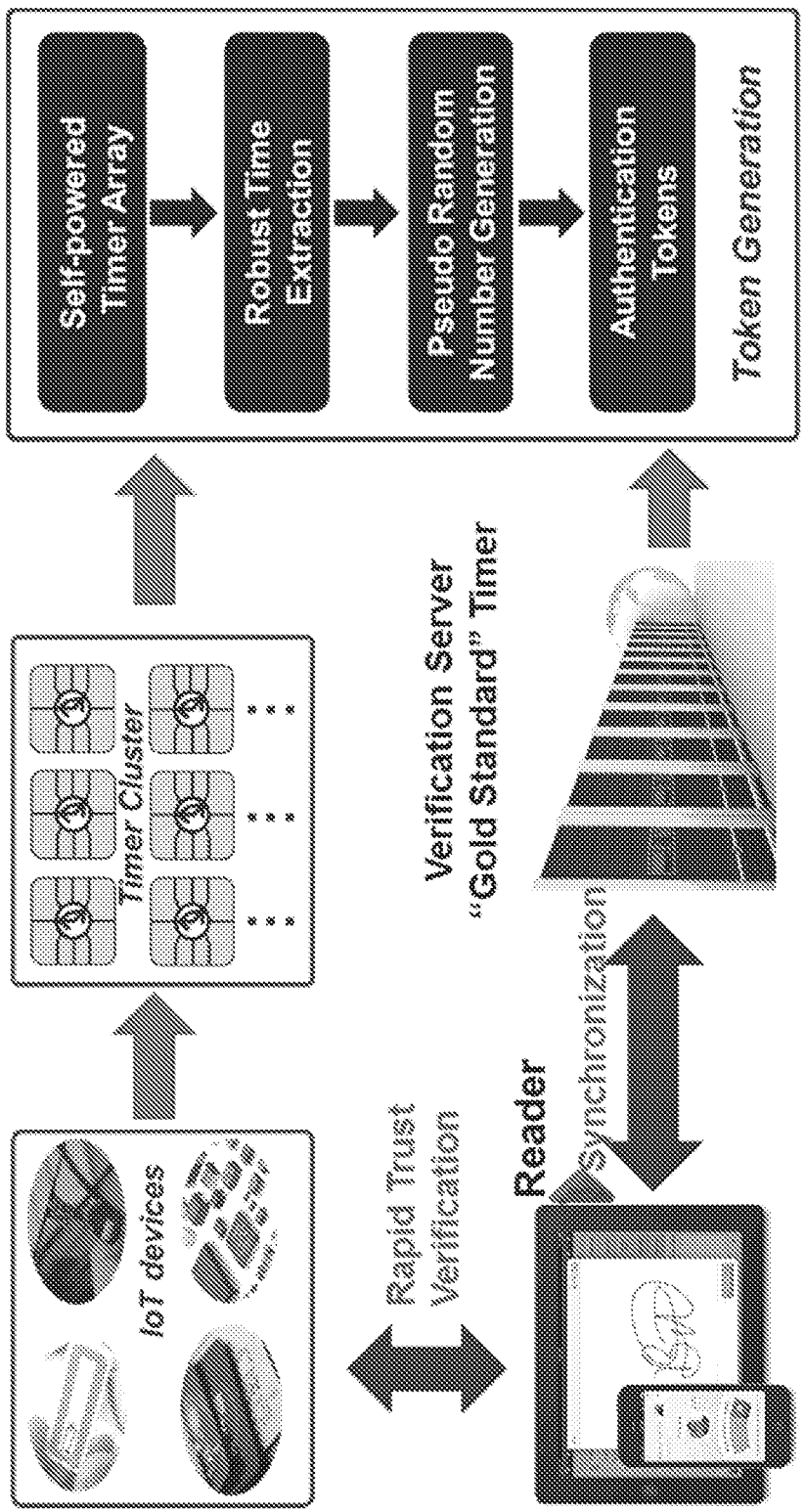
FIG. 3 is a flowchart of rapid trust verification and authentication using zero-power timer technology.
Figure 10:
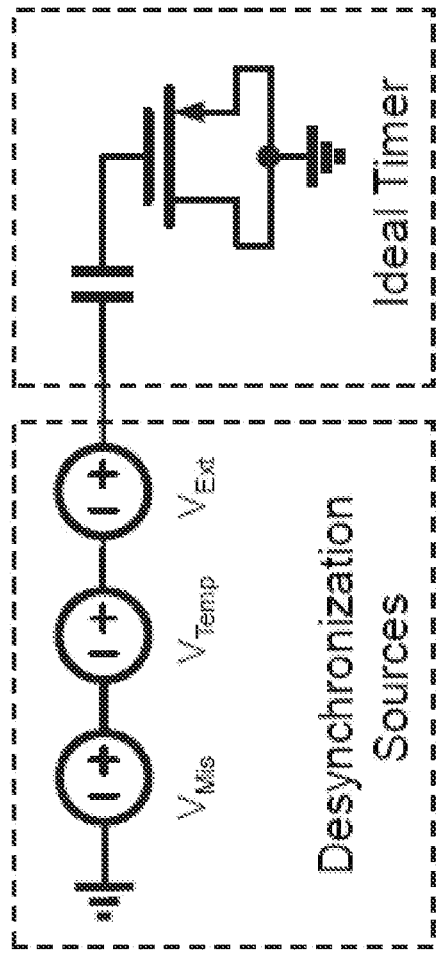
FIG. 10 is a model of desynchronization where a modulation voltage Vm is used to capture different sources of desynchronization.

All these desynchronization effects are modeled to understand the degree of tolerance that these chipsets can sustain for a DoS attack. Note that desynchronization between the two timers can also arise due to the mismatch in the average oxide thickness. Given that the gate-oxide thickness is a very well controlled parameter in most modern semiconductor process, it is expected that responses will not significantly deviate across different devices. The relative desynchronization between the timers can be modeled using a modulation source $V_m = V_{Mis} + V_T + V_{ext}$ coupled to the floating-gate node (see FIG. 10). Here, the effect of mismatch and initialization/programming error is modeled using a constant modulation signal $V_{Mis}$. $V_T$ captures the effect of temperature variations and can be approximated by a linear function as $$V_T = \zeta(T - T_0) + V_{T0} \qquad \text{(eqn. 3)}$$

where ζ is the temperature coefficient and $V_{T0}$ is the value at $T_0$. Since $V_T$ is a function of the ambient temperature, two synchronized timers going through ambient environment with different temperature variations could become desynchronized (see FIG. 9B). Similarly, $V_{ext}$ captures the effect of the coupling of an extrinsic signal like a radio-frequency signal. Note, that the equivalent input impedance of the timer device is predominately capacitive (with a leakage resistance). Thus, any rectified energy source would be able to modulate the response of the timer. The modulation voltage $V_{ext}$ generated by RF signals induced at the timer input is related to the ambient or received RF power P as $$V_{ext}=(2Re\lambda P)^{1/2} \quad (\text{eqn. 4})$$

where $\lambda$ is the power loss coefficient and Re is the effective load resistance. Note that the power received P across a micrometer-scale metal-trace could be extremely small, resulting in a small Vext. Using the modulation voltage Vm, the desynchronization error between two different timers could then be approximated using a first-order time-dependent model as:

$$\Delta V = k_1 V_m / (k_{1t} + k_0) \quad (\text{eqn. 5})$$

where $k_1$ and $k_0$ are the timer model parameters (see FIG. 3). This first-order model (effectively using a parameter Vm) is used to predict the degree of expected desynchronization under a specific field-operating condition. This error would is used to adjust the acceptance thresholds public-key exchange protocol as discussed herein.

Impersonation attacks: The private key Ki is only known to the server and is encoded only through the dynamics of the FN-timer. The state of the timer can only be accessed through a single read-out interface and the requirement to physically measure the state will provide the initial level of security. Furthermore, the self-powered operation of the timer and the single-electron dynamics of the timer do not leave any trace of a side-channel that could be accessed. Furthermore, each of the timer can be accessed only once implying it is practically difficult for the attacker to guess the key.

Forward and backward traceability attacks: As shown, the user broadcasts the pair (ti, φi) only after sufficient time Δt has elapsed. During this time interval Δt the timer output would have changed more than the LSB of the measurement ADC. This will insure that the adversary cannot predict the measured bit bi, given that the state of the timer Ki is unknown to the adversary and the timer state can only be read once.

Evaluation Plan For Timer Based Public-Key Distribution

Figure 11A:
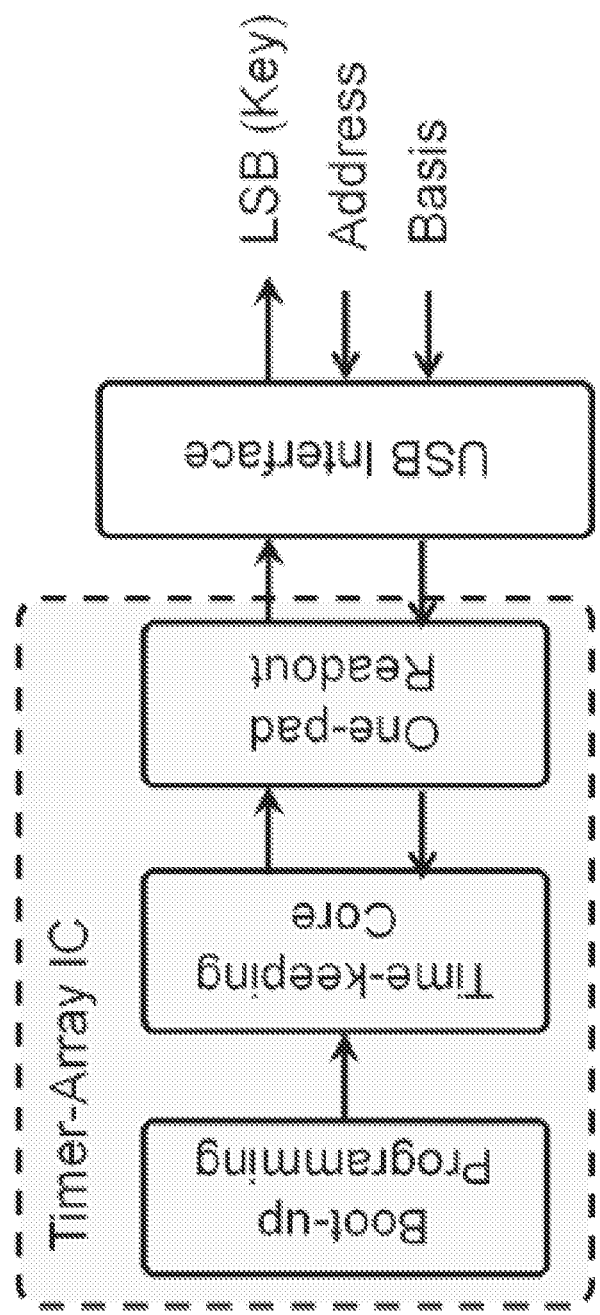
FIG. 11A is a system-on-chip architecture of the proposed timer-array to support the public-key distribution protocol.
Figure 11B:
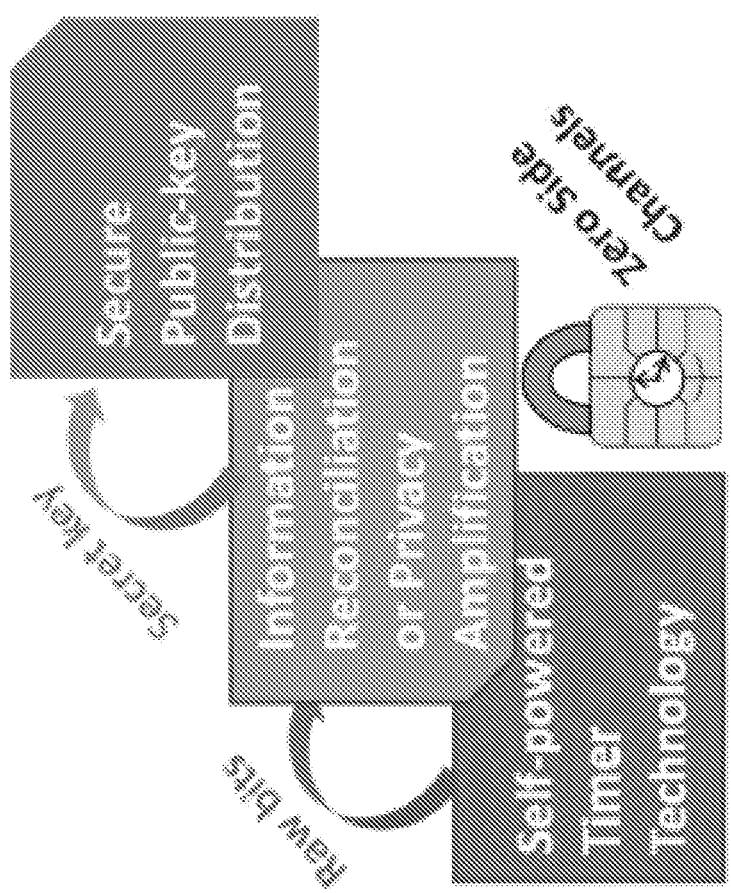
FIG. 11B is a hardware and software end-to-end solution to improve the reliability of the proposed timer-array.

A system-on-chip and circuit implementation of the self-powered timer array and the corresponding read-out, programming and initialization modules are investigated. An algorithmic framework that will further improve the reliability and security of the distributed public-key, using information reconciliation approaches or privacy amplification approaches is also investigated. The system level architecture of the timer SoC and its interface is shown in FIG. 11(a). The SoC will integrate a programming interface such that the initial state of the FN timers can only be programmed once. Since the programming will be done at the server, it will be assumed that the server can disable the programming feature using an electronic fuse. To read the value of the timer after programming, the address of the timer along with basis ID will be provided to a USB interface. The timer SoC will then return the value of the measured bit which will then be processed by a software stack shown in FIG. 11(b). The software stack will implement basic error correction functions and privacy amplification functions similar to what is used in the quantum key-exchange protocols. The goal of this step is to determine that the timer chipset is not damaged or have not been tampered with. The extracted private key would then be used for supporting a single communication or transaction session using classical cryptographic protocols.

Key Generation and Exchange Protocol

Figure 12:
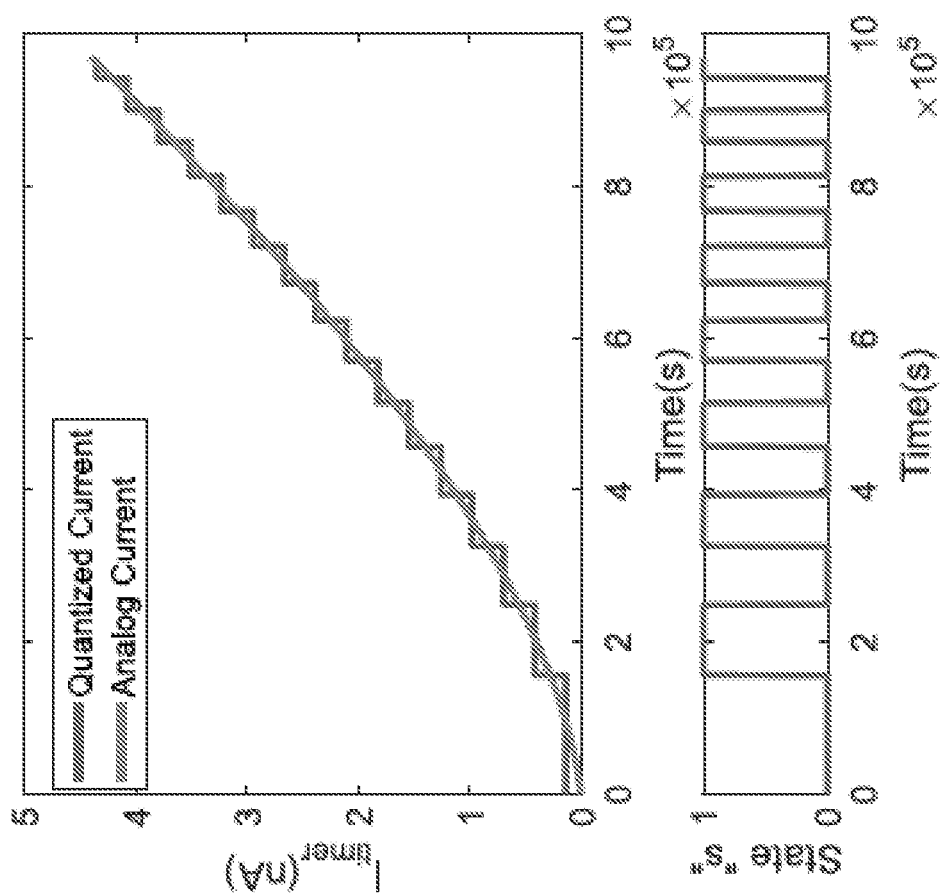
FIG. 12 is a key generation process from an analog readout circuit.
Figure 13:
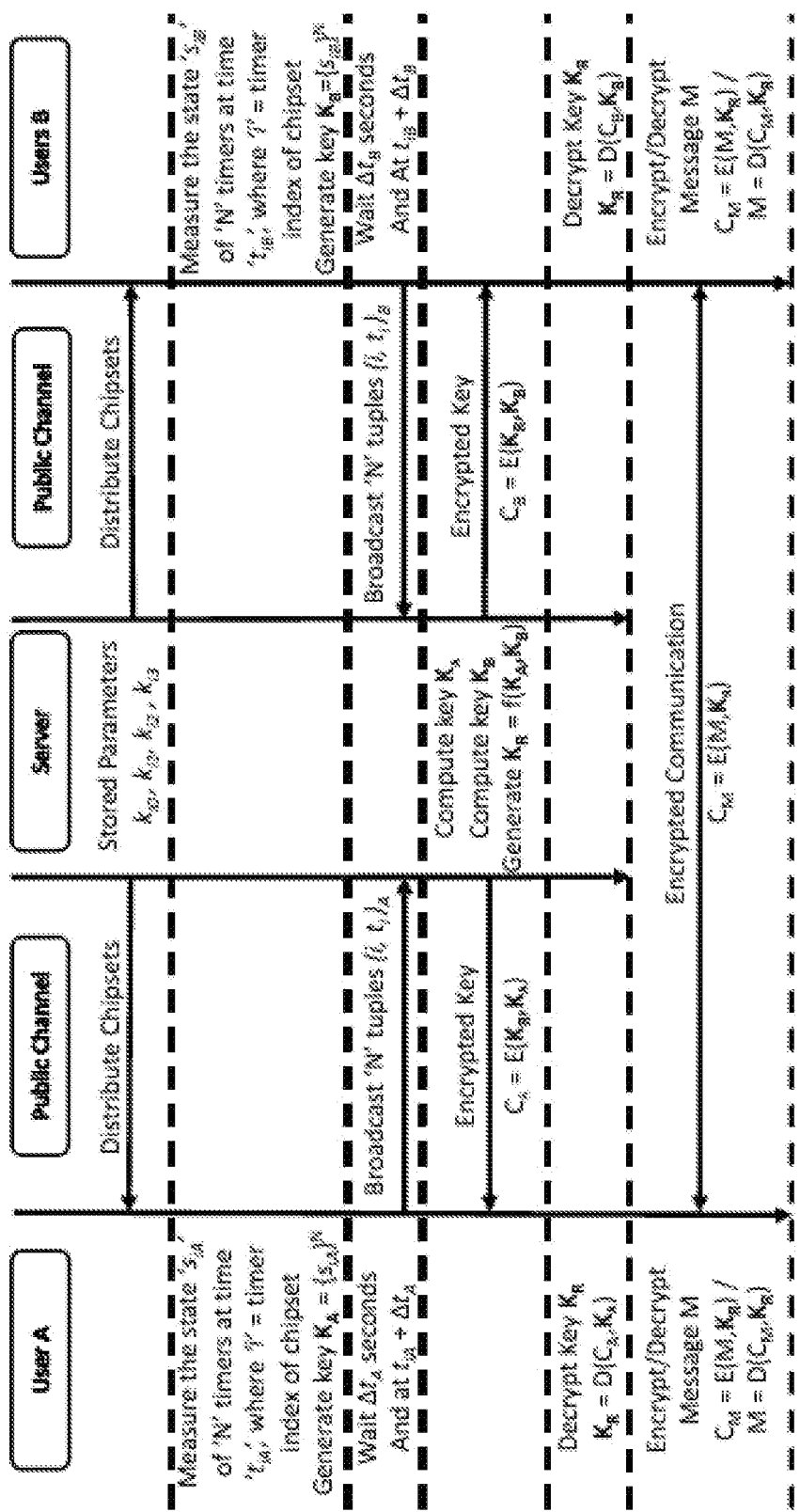
FIG. 13 is a key exchange protocol between two users with a server acting as a trusted third party.
Figure 14:
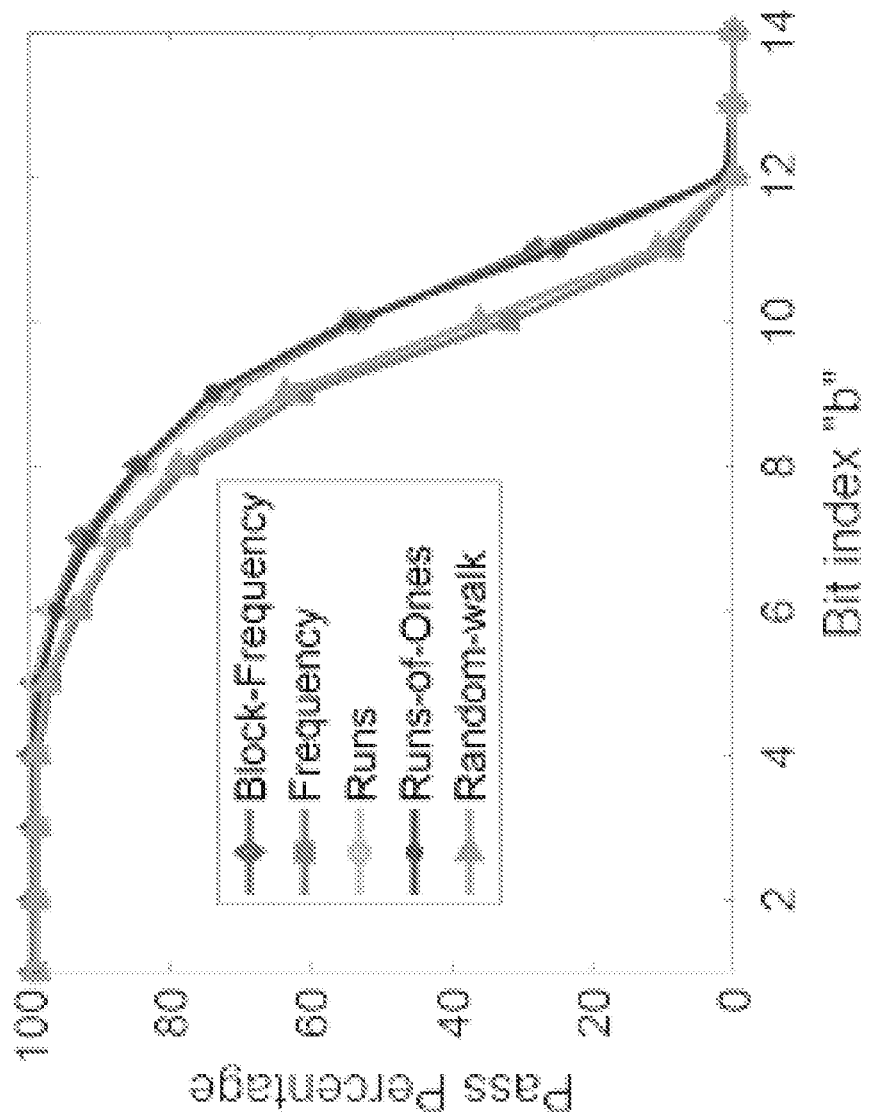
FIG. 14 is a graph of pass percentage from the NIST randomness test suit for testing keys generated in current domain.

In order to generate the key-string, the state 's' of the timers on the chipset is measured where sf{0, 1}. The procedure for measuring 's' involves quantizing the analog reading of the timer current to certain number of bits of precision (for example using a 16 bit Analog to digital converter which is quite common commercially) and then choosing one of those bits as the state of the timer. This is illustrated in FIG. 12 where the timer response is quantized with 4-bits of precision and the LSB is chosen as the state of the timer at any given time. However a 16-bit quantizer is chosen for analysis purposes and 'b' would represent the index of the bit chosen as the state of the timer. Bit index 'b=1' corresponds to using the lowest significant bit (LSB) of the quantizer and 'b=16' corresponds to the most significant bit(MSB) of the 16-bit quantizer. After a set of timers is used to generate a key-string, the value on those timers will be destroyed i.e. desynchronized with its server clone. This means that each timer can only be used once for key-generation. Note that the chipsets are designed in such a way that each measurement on a particular timer only gives out one bit of information i.e. the state 's' and the process is highly non-linear due to the use of quantization function. A server (Alice) creates multiple replica of identical timer chipsets where each of the timer in a single chipset have been programmed with different form factors K. Only the server has access to these information which are kept secret from the users. These identically programmed chipsets are then distributed to all users over a public channel. When an intended user (Bob) wishes to communicate with the server (Alice), he measures the state s of the $i^{th}$ timer at time instant t where if□$^+$ refers to the index of the timer on the chipset and t d l$^+$ indicates the Greenwitch Mean Time of measurement. This process is repeated for N number of timers to generate an N bit long key KB, where KBf$\{0, 1\}^N$. After a random delay Δt seconds, Bob broadcasts all N tuples of (i, t) over the public channel. The server (Alice) then uses the tuples (i, t) and her knowledge of the secret keys K to decipher the states s of the timer and compute KB. The adversary (Eve) on the other hand does not have access to K and therefore cannot use the public information (i, t) to decipher the states s. Also, Eve is unable to rewind/reset the hardware timer on her copy of the chipset to measure the states si. Because the timers are designed for one-time access/read-out, Eve is unable to make multiple measurements on the timer to infer any useful information (using machine learning approaches) about K or si. Note that the construction and the operating physics of the self-powered timer [22] also prevents Eve to probe the state of the timer using any side-channel and without affecting the state of the timer. Therefore, in this regard, the timer chipset emulates a quantum communication channel, but using an analog dynamical system instead of photons. The above key-exchange protocol is suitable only for communicating between one of the users and the server. However, communication between two users can be facilitated with the help of the server who in this scenario will function as a trusted third party as shown in FIG. 13. Both the users broadcasts their tuples (i, ti)A and (i, ti)B over public channel. The server deciphers both keys, KA and KB by rewinding the software clock. The server then generates a new key KR which is a function of the keys KA and KB. This function $f$: $\{0, 1\}^{2N} \to \{0, 1\}^N$ is decided by the server and can be any mathematical operation ranging anything from multiplication to complicated hashing. This operation is never revealed and changed for every session. The server then sends cypher texts CA=E(KR, KA) to user A and CB=E(KR, KB) to user B containing the key KR encrypted using KA and KB respectively. The users can decrypt the cypher text to know the encryption key KR. For further communication each user uses this key to encrypt and decrypt their messages. Since, all keys are randomly generated and have never been used before then anyone intercepting the cypher text will not gain any information regarding the encryption key being used. Note that in this protocol the users do not need to match neither the timers they used in the chip nor the time at which they will generate their respective keys. They only need to agree upon their time of communication and can generate their keys beforehand individually. The keys generated as described here were tested with the National Institute of standards test (NIST) suite for checking the randomness of each bit stream. The suite usually consists of a total fifteen different test to measure randomness in a certain bit stream. However, these tests are designed for a random number generator and few of them requires a large sequence of bit stream which is not appropriate in t scenario. Hence, the results shown in FIG. 14 for only those tests which could be applicable for the 128-bit keys that were generated. A Monte Carlo simulation was run where $10^6$ keys were sampled at random time instances using a 16-bit quantizer. The keys were generated using bit index from LSB to the $14^{th}$ bit of the quantizer and then tested each of those keys with NIST suite. FIG. 14 shows the percentage of keys which passed the test where $$\text{Pass Percentage} = \frac{\text{Number of keys passed}}{\text{Total number of keys tested}} * 100. \quad \text{(eqn. 6)}$$

It may be observed from the graphs that when lower indexed bits are used for key generation, almost all the keys pass the test. As higher order bits are used, the randomness starts to fall off, around $7^{th}$ bit. This can be explained by the fact that higher indexed bits do not change much over the period of an FG timer's lifetime and thus the keys generated with these bits tend to be less random in nature. Therefore, as long as lower order bits are used for key generation (upto $6^{th}$) it may be concluded that keys are completely random in nature. Thus, any adversary trying to 'guess' the encryption key will have to resort to 'brute force' method to be successful.

In the previous part only an adversary was considered who attempts to 'guess' the encryption key without any knowledge about the system. In this part an adversary (Eve) who has access to one of these identical chips along with knowledge about the timer models i.e. knows eq(1) will be considered. Furthermore, it is assumed that the scenario is where Eve can passively eavesdrop over the public channel. In this scenario Eve can listen to the conversation between Bob and Alice during key exchange. Consequently, Eve will be able to sample his own chipset as soon as Alice broadcasts her pair information (i, ti) over public channel and can try to make an 'educated guess' with the information that is available to her. The key that Eve would generate will be at time ti+Δt, where Δt is the time that Bob waits after he generated the key. Since the timer values are constantly changing, the key generated by Eve, KE, will be different than the key generated by Bob, KB. The goal is to quantify how much, if any at all, information can Eve gain about KB with her own key KE. In order to do that a proper metric needs to be defined which takes both the keys into account expresses if knowing one of them can help predict the other.

This can be done by using average Shannon information entropy contained in each bit generated by Eve and calculating the average Shannon information entropy per bit that can be expressed as $$H = -d\log_2 d - (1-d)\log_2(1-d) \quad \text{(eqn. 7)}$$

where d is the average difference in bits between KB and KE. The parameter 'H' quantifies the uncertainty of Eve for every bit of the key KB that she tries to predict using KE. When d=0 i.e. Eve generates the same key as Bob, the information entropy of Eve is zero, this is because Eve can predict the key with no uncertainty. A similar argument can be made for the other extreme, when d=1, as Eve can simply invert each bit that she generates and produce KB. The entropy H takes a minimum value of 0 in this case. On the other hand, when d=0.5 exactly half of the bits of KE does not match with KB. This means that if Eve were to randomly guess all the key-bits she would, on average, end up with the same number of matched bits. Therefore, Eve has 1 bit of uncertainty for every bit generated and zero information gain on the key. The entropy H takes the maximum value of 1 in this case. So it is concluded that this metric is justified for quantifying this attack.

Figure 15:
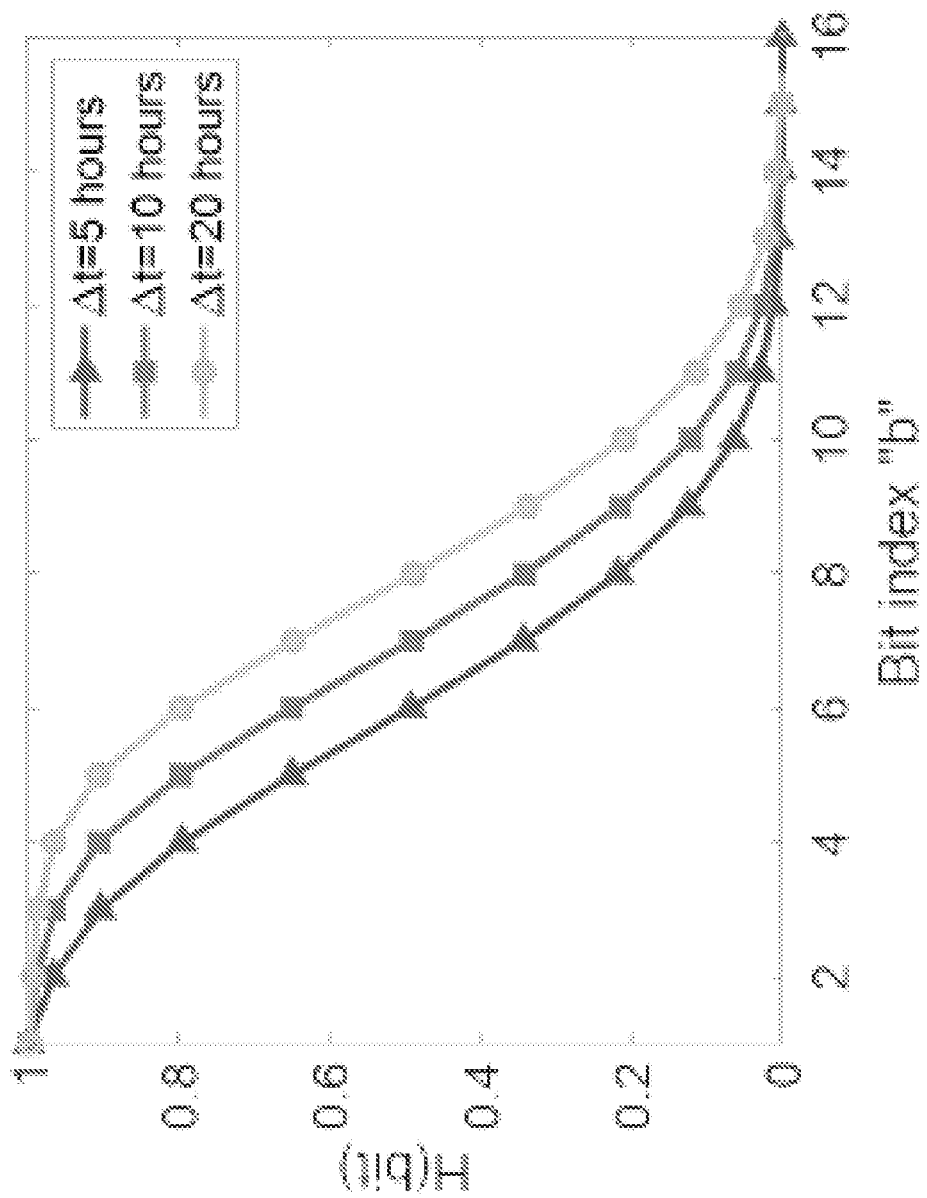
FIG. 15 is a graph of uncertainty per bit measured at three different waiting periods in current domain.

In order to mimic such a kind of attack the timers are sampled and generated keys at random time instances, representing Bob's key, and also sampled the timers at a later instant, which represents Eve's key. After that the entropy for each sample was calculated. FIG. 15 shows the average uncertainty per bit generated by Eve when she samples the same timer array used by Bob (pseudo code provided in supplementary). It is observed from the FIG. 15 that for the same wait period (which corresponds to Δt)), as the bit used for key generation move towards LSB, the uncertainty per bit increases. This is because the LSB contains minimum information about the whole dynamic response of the timer. Moreover, LSB changes much more frequently and therefore key generated using LSB is more difficult to predict for the same waiting period. It gets increasingly easier to predict the closer to MSB it is, since these bits chang slowly and sampling them gives more information.

However, the uncertainty can be increased for higher indexed bits by increasing the waiting period Δt which is shown in the FIG. 15 where the curve shifts towards right as Δt is increased. This is because as Δt is increased, the probability that a certain bit has changed will also increase, thereby sampling them will not provide any useful information. Thus, the protocol is secure against any such attack where the adversary uses a key generated after eavesdropping the initial communication between the user and the server.

The adversary Eve could try to predict the key by using her knowledge about the software model. However, since she does not have access to the parameters K this approach will also prove to be void. In the best-case scenario, she could learn the parameters ki1 and ki2 which depends on the material properties and fabrication artifacts through gaining knowledge about the complete fabrication process which is highly unlikely as the foundry takes great measures to keep this information secret. Nevertheless, she would still be unaware of the parameter ki0 $^{and}$ ki3, which depends on the initialization and biasing condition of the timer. This information is only known to the server and is never exposed at any moment. She could try to infer this parameter by sampling the timer at multiple instances and then using some form of machine learning approach. This is also practically impossible because each of the timer can be measured only once (onetime measurement). Also, due to the inherent security of the quantum-tunneling device, the content or state of the timer cannot be physically probed using side-channels (power or electromagnetic).

Figure 16:
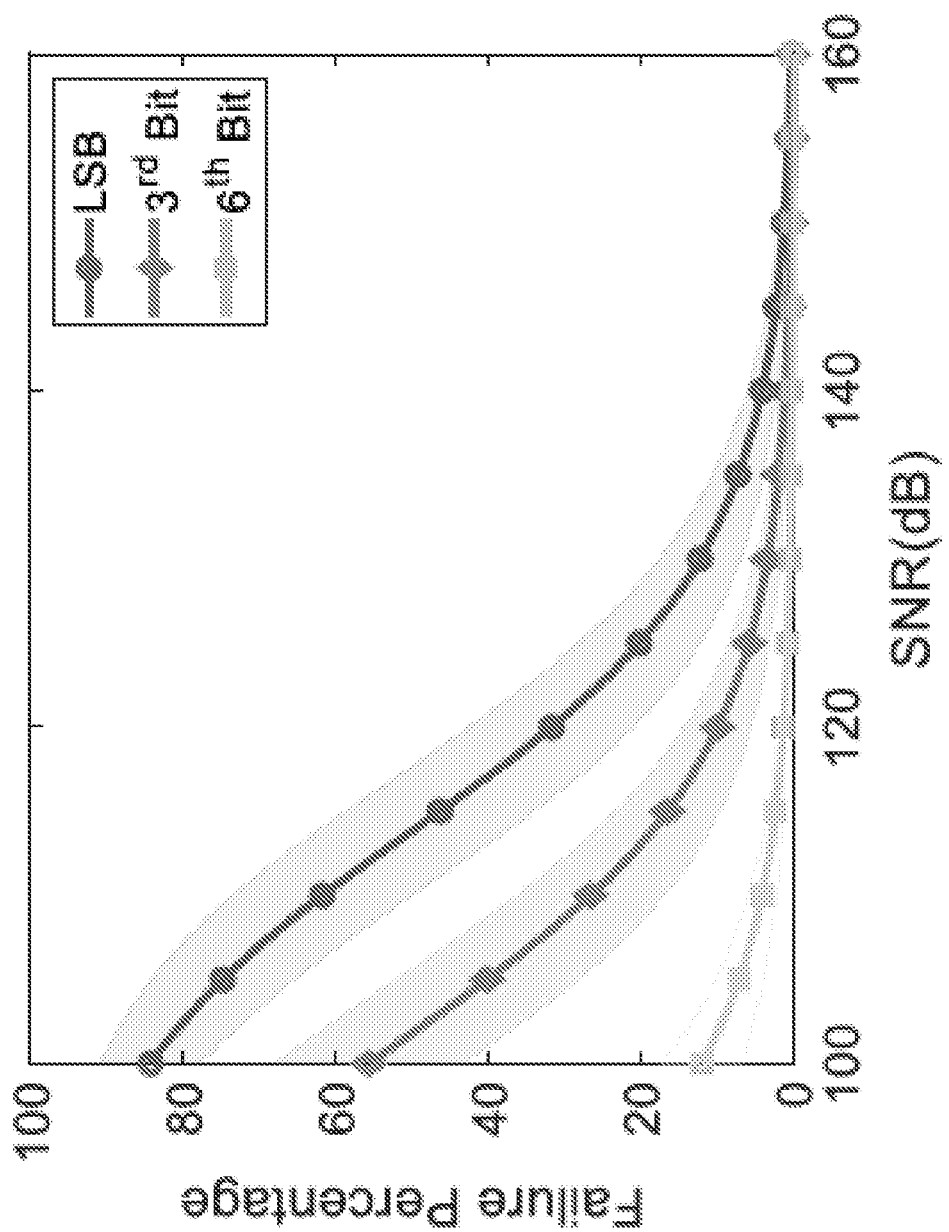
FIG. 16 is a graph of an increase in noise robustness of a key exchange protocol when a higher order bit is used for key generation in current domain.

So far, it may be seen how the protocol holds against any security attack from both a 'knowledgeable' and an 'ignorant' adversary's point of view. Now it must be determined how the physical timer chip performs in real world scenario. The timer on physical chip could desynchronize with the software model in the server which would lead to a failed key exchange. This could be due to fabrication mismatch, environmental effect, wear and tear, and measurement noise. A Monte Carlo simulation was ran where Gaussian White Noise(GWN) was added to the timer response and then generated keys by sampling at random time instances. Note that this is representing the noise associated with the readout and other source of noise mentioned before and not any noise involved in the communication channel. The SNR here can be defined as $$SNR = \frac{P_{Signal}}{P_{Noise}} \qquad (eq.\ 8)$$

where PSignal is the power for the analog reading of timers and PNoise is the hardware noise power. This 'measured' key was compared against the 'gold' key generated from the software model in the server i.e. without any noise. Every instance where the keys do not match is counted as failure. FIG. 16 shows the average failure percentage at each noise level where $$Failure\ Percentage = \frac{Number\ of\ unmatched\ keys}{Total\ number\ of\ keys} * 100 \qquad (eq.\ 9)$$

The shape of the curves is quite par for the course with less failures for higher signal to noise ratio (SNR).

A better performance could also be achieved by using higher order bits for key generation as shown in FIG. 16. However, as shown in the previous section this could lead to more information gain by the 'knowledgeable' adversaries for predicting the key. In order to nullify this threat the server can recommend the user to opt for an increase in the wait-period and achieve the same level of uncertainty even for higher order bits which was illustrated in FIG. 15. Thereby, here a tradeoff also lies between the level of security and the waiting period. Depending on the application and security concern the server can decide which bit to use and the amount of wait-period.

In the previous section how the protocol's robustness to noise could be increased by either trading off security/complexity or waiting period was discussed. In this section, a new protocol is discussed and shown in FIG. 17 where performance can be improved without compromising neither security, nor waiting time by using standard error correcting codes which are generally used in digital communication. For this case, cyclic-redundancy-check (CRC) for error correction is used. The focus is on adapting the error correcting scheme to make it suitable to use in the new protocol and how much improvement.

Figure 17:
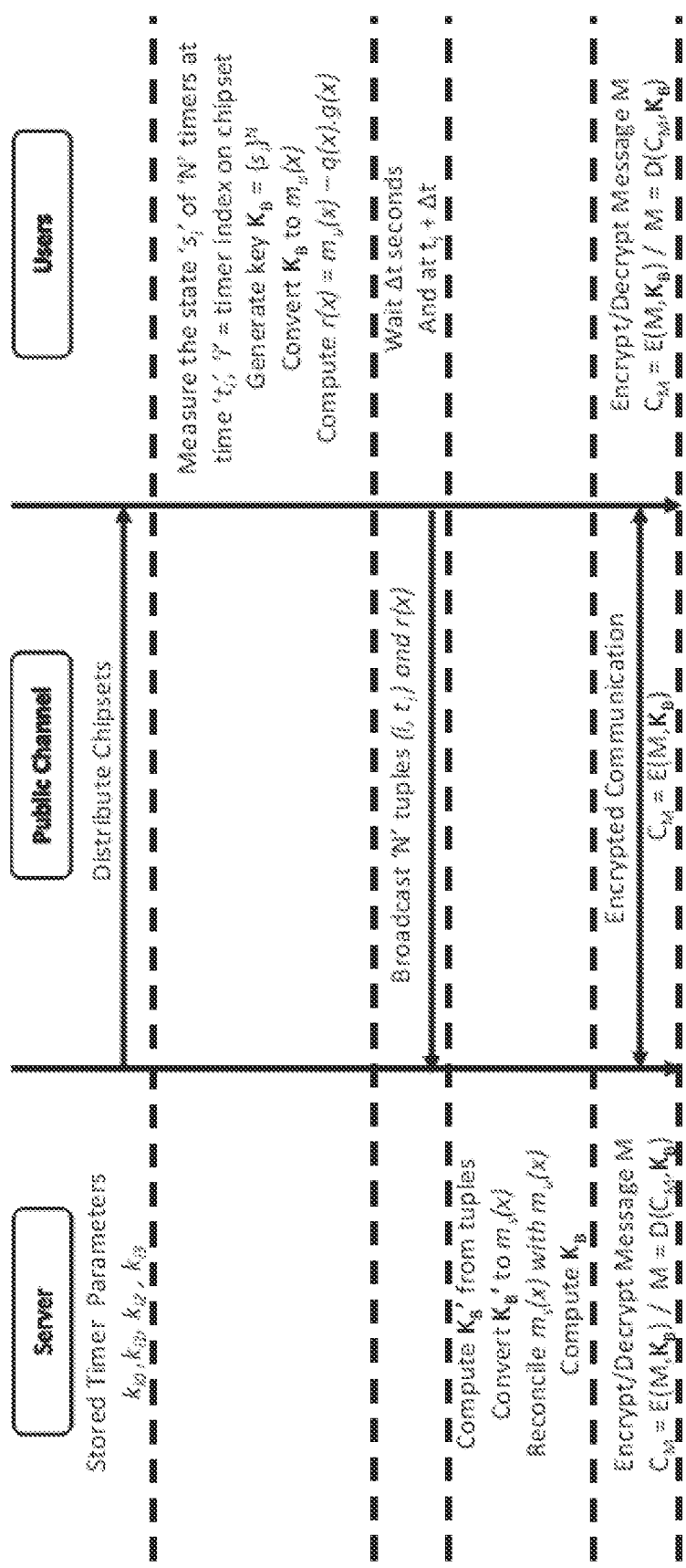
FIG. 17 is a key exchange protocol between the server and a user with error corrections.

The string of key-bits are represented as the coefficients of a message polynomial, m(x), over Galois field (GF2) and to find the CRC, the message polynomial is multiplied by $x^n$ and then the remainder r(x) is found by dividing with an n-degree generator polynomial g(x). The coefficients of the remainder polynomial are the bits of the CRC. This can be expressed as $$m_u \cdot x^n = q(x) \cdot g(x) + r(x) \qquad (eq.\ 10)$$

where q(x) is the quotient. Typically, $m_u(x) \cdot x^n - r(x)$ and g(x) is sent over the communication channel. However, in this protocol r(x) i.e. only the CRC bits together with the tuples (i, ti) is sent over insecure channel as illustrated in FIG. 17 and g(x) is assumed to be predetermined and a public knowledge. This is because the message $m_u(x)$ which is the key itself is not to be shared. The server generates the $m_s(x)$ using the tuples (i, ti) information and the software model. Then, together with r(x) and g(x) the sever can reconcile $m_s(x)$ with $m_u(x)$ up to certain hamming distance. Thereby tolerating erroneous key-bits measured by the user due to noise.

From security point of view, the adversary Eve now has more information about the key in this scenario as the remainder r(x) is broadcasted along with the (i, ti, b) pair. As a result, the complexity of the key reduces which can be quantified by calculating the reduction in the number of possible keys in the key space. For example, let m(x) be the representation of a 128-bit key. Then the number of possible keys=$2^{128}$. It may be assumed that Eve has an identical chip himself. Let g(x) be a 16-degree polynomial, then with the knowledge of r(x) the number of possible keys is reduced to $2128-16=2^{112}$. Therefore, the complexity decreases proportional to the degree of generator polynomial used i.e. number of CRC bits.

Figure 18:
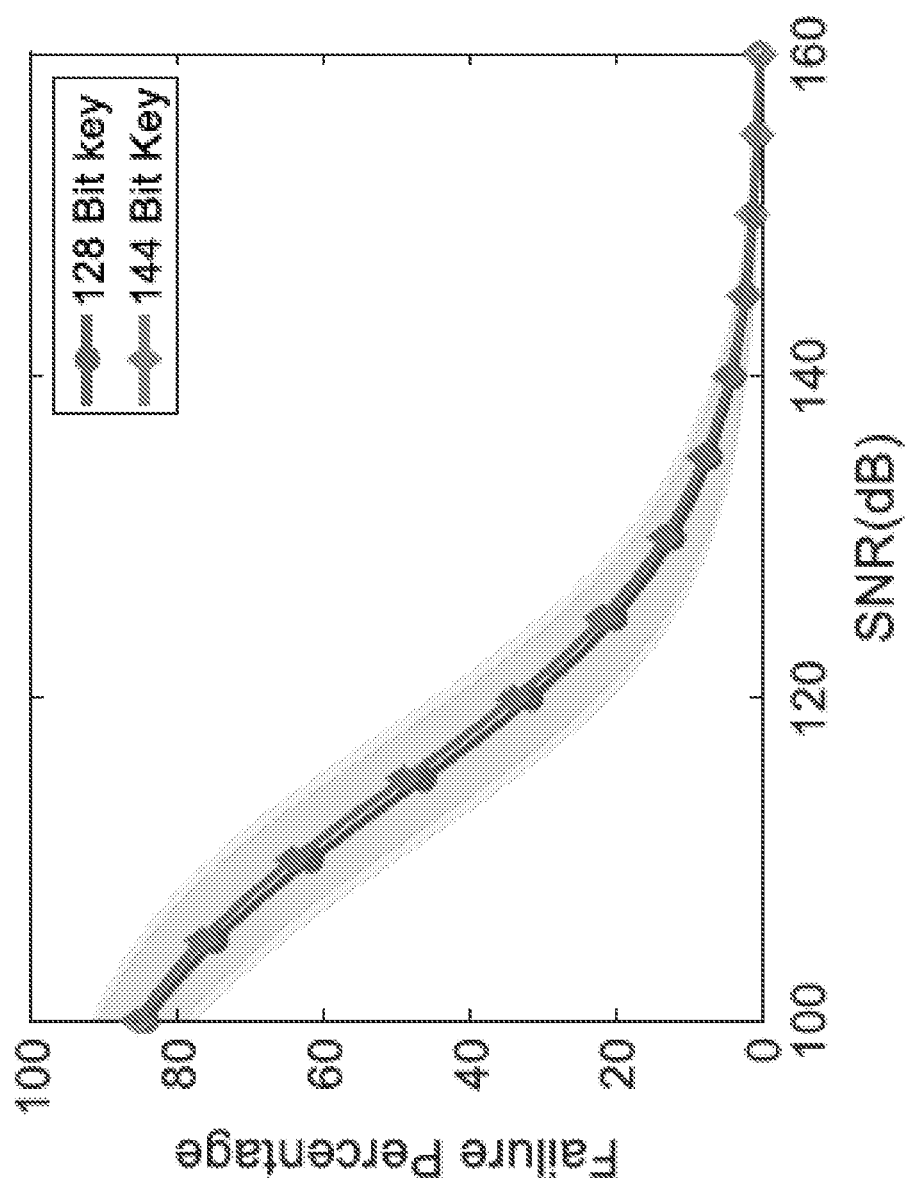
FIG. 18 is a graph of increase in failure percentage key-exchange protocol against noise when higher numbers of timers are used for key generation in current domain.

In order to counteract this effect, the length of the key can be increased by an amount equal to the degree of g(x). This would mean more timers are needed to be used for an effective key length equal to number of timers used minus the degree of g(x). In the example described above, the number of timers required for an 128 bit effective key length would be 144. However, as the number of timers is increased, the fail percentage increases for the same SNR as shown in FIG. 18. This is intuitive as when the number of timers increases, for the same noise level the probability that a single timer is misread i.e. fails also increases. But in this scenario, certain mismatches due to error correction may be tolerated.

Figure 19:
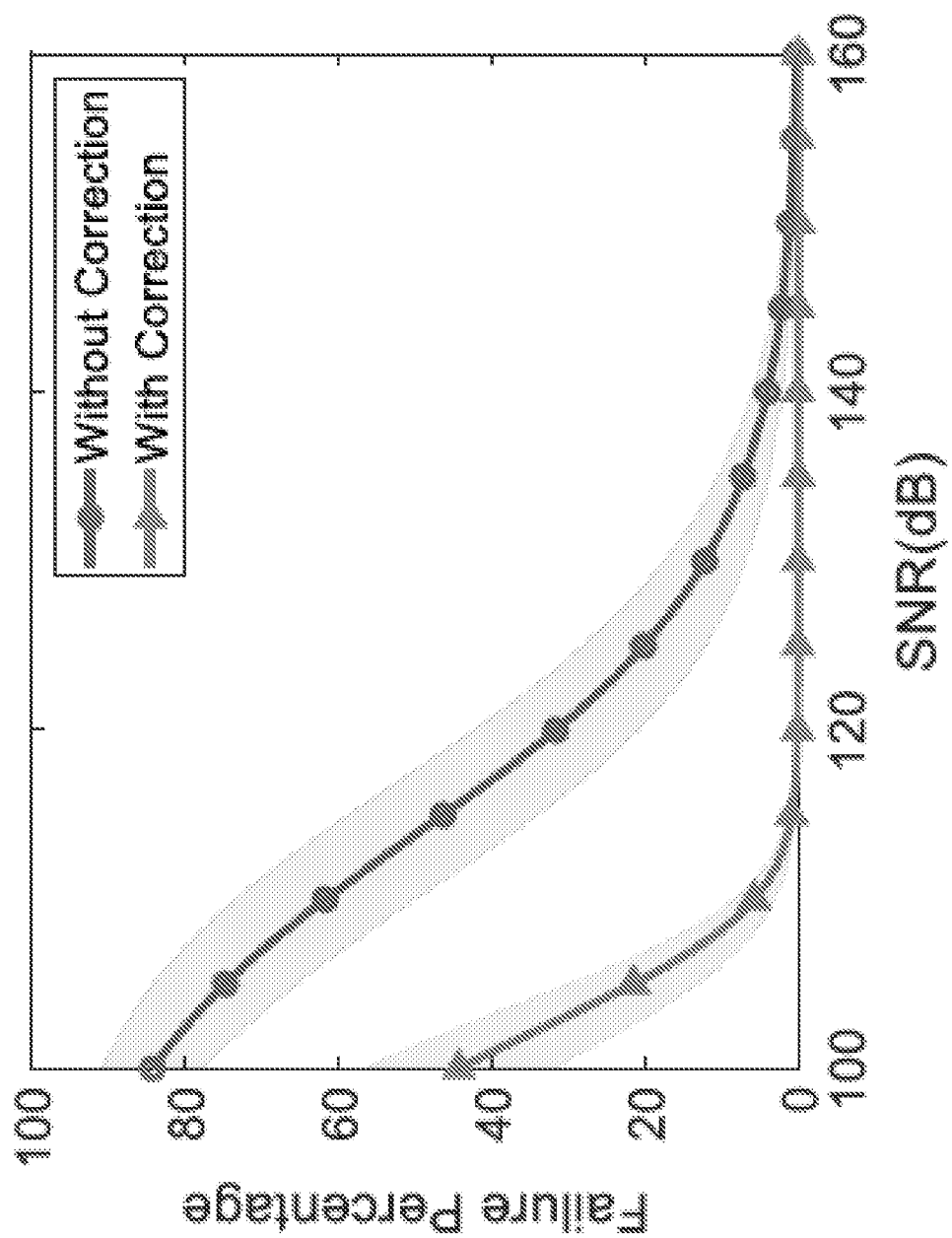
FIG. 19 is a graph of increase in performance of the key-exchange protocol against noise when error correction is implied in current domain for least significant bit (LSB).
Figure 20:
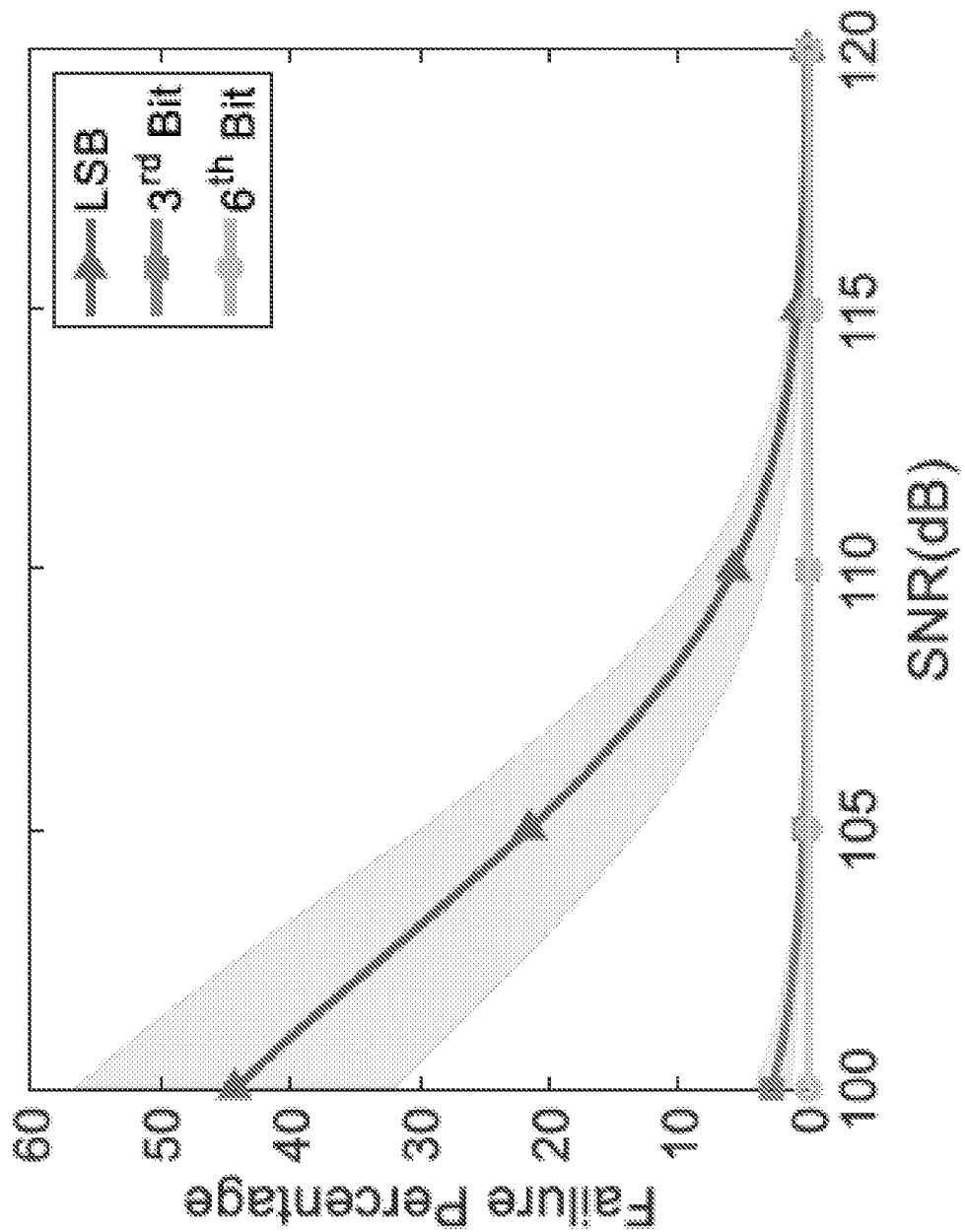
FIG. 20 is a graph of increase in performance of a key-exchange protocol against noise when higher order bit is used for key generation along with error correction in current domain.

According to the table of CRC generator polynomial, for a g(x) of 16 degree and data-word length less than 241 bit, the least hamming distance that can be corrected is 5. Therefore, a fair comparison would be when 5 mismatches for the 144-bit key are allowed, which has an effective key length of 128-bits, and then compare the noise robustness to the 128-bit key. This is illustrated in FIG. 19 which shows significant improvement in performance. This is achieved without sacrificing any complexity and does not come at the cost of a longer waiting period. Performance can be further improved by using higher order bits for key generation as shown in FIG. 20 if the user opts for more accuracy and is comfortable with a longer waiting period.

This disclosure is directed toward a one-time self-powered timer circuit whose state can be measured only once, after which the timer will desynchronize itself. In this manner, the timers can only be used for one-pad authentication. The disclosure is further directed toward the security of the public-key distribution algorithms that will exploit the synchronization between billions of hardware-software timers, time reversibility of software timer and time irreversibility of hardware timers and one-time read-out to deliver classical and quantum-like benefits. The disclosure is lastly directed to system-on-chip and circuit implementation of the self-powered timer array, read-out, programming and initialization modules that implements the proposed public-key distribution algorithms.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are example only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for public key security distribution comprising:
    a hardware self-powered timer; and
    a server comprising a processor and a memory, the memory storing instructions that, when executed by the processor, cause the processor to:
    operate as a software clone of the hardware self-powered timer, the software clone being synchronized to the hardware self-powered timer, the software clone being rewindable to any previous time-instant, and the hardware self-powered timer being time irreversible;
    combine an output of the hardware self-powered timer with a pseudo-random number generator (PRNG) to produce authentication tokens;
    receive a request signal from an internet-of-things (IoT) device; and
    seed the PRNG using the request signal and a state of the hardware self-powered timer via a linear feedback shift register (LSFR).

2. The system of claim 1, wherein the hardware self-powered timer desynchronizes from the software clone when the state of the hardware self-powered timer is read.

3. The system of claim 2, wherein the state of the hardware self-powered timer is measured using a plurality of basis functions and can only be accessed through a single read-out interface once, after which the hardware self-powered timer desynchronizes into a random state.

4. The system of claim 1, wherein the hardware self-powered timer is a Fowler-Nordheim (FN) tunneling device.

5. The system of claim 1, wherein the system operates using hash-based mutual authentication protocol (HMAP).

6. The system of claim 1, wherein operating a software clone of a hardware self-powered timer comprises a hash-based mutual authentication protocol (HMAP).

7. A method for public key security distribution, the method comprising:
    operating a software clone of a hardware self-powered timer;
    synchronizing the software clone to the hardware self-powered timer;
    combining an output of the hardware self-powered timer with a pseudo-random number generator (PRNG) to produce authentication tokens;
    receiving a request signal from an internet-of-things (IoT) device;
    seeding the PRNG using the request signal and a state of the hardware self-powered timer via a linear feedback shift register (LSFR);
    rewinding the software clone to any previous time-instant, wherein the hardware self-powered timer is time irreversible;
    reading the state of the hardware self-powered timer; and
    desynchronizing from the software clone.

8. The method of claim 7, wherein reading the state of the hardware self-powered timer comprises using a plurality of basis functions and can only be accessed through a single read-out interface once, after which the hardware self-powered timer desynchronizes into a random state.

9. The method of claim 7, wherein the hardware self-powered timer is a Fowler-Nordheim (FN) tunneling device.

10. A computing device for public key security distribution, the computing device comprising a processor and a memory, the memory containing instructions that program the processor to:
    operate a software clone of a hardware self-powered timer;
    synchronize the software clone to the hardware self-powered timer;
    combine an output of the hardware self-powered timer with a pseudo-random number generator (PRNG) to produce authentication tokens;
    receive a request signal from an internet-of-things (IoT) device;
    seed the PRNG using the request signal and a state of the hardware self-powered timer via a linear feedback shift register (LSFR); and
    rewind the software clone to any previous time-instant, wherein the hardware self-powered timer is time irreversible.

11. The computing device of claim 10, wherein the memory contains instructions that program the processor to read the state of the hardware self-powered time and desynchronize from the software clone.

12. The computing device of claim 11, wherein the memory contains instructions that program the processor to read the state of the hardware self-powered timer by using a plurality of basis functions and can only be accessed through a single read-out interface once, after which the hardware self-powered timer desynchronizes into a random state.

13. The computing device of claim 10, wherein the memory contains instructions that program the processor to verify the public key security distribution with cyclic-redundancy-check (CRC) for error correction.

14. The computing device of claim 10, wherein the memory contains instructions that program the processor to operate the software clone of the hardware self-powered timer using hash-based mutual authentication protocol (HMAP).

\* \* \* \* \*